(12) United States Patent
Hatakeyama et al.

(10) Patent No.: US 6,545,587 B1
(45) Date of Patent: Apr. 8, 2003

(54) BIDIRECTIONAL REMOTE CONTROL SYSTEM, BIDIRECTIONAL REMOTE CONTROLLER, AND DEVICE CONTROLLED BY BIDIRECTIONAL REMOTE CONTROLLER

(75) Inventors: Takeshi Hatakeyama, Osaka (JP); Mitsuru Kitao, Yamatokoriyama (JP); Kenichi Moriguchi, Neyagawa (JP); Toshihiko Kurosaki, Kobe (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/229,612

(22) Filed: Jan. 13, 1999

(30) Foreign Application Priority Data

Mar. 6, 1998 (JP) .......................... 10-054665

(51) Int. Cl.[7] .............................. G05B 23/02
(52) U.S. Cl. .................... 340/3.31; 340/3.1; 340/3.3; 340/825.22; 340/825.37; 340/825.69; 340/825.72
(58) Field of Search .................. 340/3.1, 3.3, 3.31, 340/825.69, 825.72, 825.22, 825.37

(56) References Cited

U.S. PATENT DOCUMENTS

| | | | | |
|---|---|---|---|---|
| 4,728,949 A | * | 3/1988 | Platte et al. ........... | 340/825.37 |
| 4,764,981 A | * | 8/1988 | Miyahara et al. ...... | 340/825.69 |
| 5,109,222 A | * | 4/1992 | Welty ................... | 340/825.72 |
| 5,444,439 A | * | 8/1995 | Kuroda et al. ......... | 340/825.22 |
| 6,005,490 A | * | 12/1999 | Higashihara ........... | 340/825.72 |
| 6,133,847 A | * | 10/2000 | Yang ..................... | 340/825.22 |

FOREIGN PATENT DOCUMENTS

| | | |
|---|---|---|
| JP | 1-115298 | 5/1989 |
| JP | 4-346597 | 12/1992 |

* cited by examiner

*Primary Examiner*—Brian Zimmerman
*Assistant Examiner*—Yves DaLencourt
(74) *Attorney, Agent, or Firm*—Parkhurst & Wendel, L.L.P.

(57) ABSTRACT

A bidirectional remote control system including a bidirectional remote controller and first and second devices controlled thereby, wherein the first device is for receiving a request of device information from the bidirectional remote controller and for sending the device information to the bidirectional remote controller. The bidirectional remote controller is also for sending the request of the device information to the first device, receiving the device information from the first device and sending the device information to the second device, which is for receiving the device information from the bidirectional remote controller.

14 Claims, 16 Drawing Sheets

BIDIRECTIONAL REMOTE CONTROL SYSTEM, BIDIRECTIONAL REMOTE CONTROLLER, AND DEVICE CONTROLLED BY BIDIRECTIONAL REMOTE CONTROLLER

FIELD OF THE INVENTION

The present invention relates to a bidirectional remote control system for controlling a device by using a bidirectional remote controller, the bidirectional remote controller, and the device controlled by the bidirectional remote controller. More specifically, the invention relates to those capable of downloading information about the operating state of the remote-controlled device (hereinafter referred to as "device information") or the like into the remote controller.

BACKGROUND OF THE INVENTION

As an example of a prior art bidirectional remote control system, there is a system in which a bidirectional communication line is disposed between a remote controller and a device controlled by the remote controller, whereby information about the operating state of the remote-controlled device is downloaded into the remote controller for display.

For example, Japanese Published Patent Application No. Hei. 1-115298 discloses such a bidirectional remote control system. In this prior art, information about the operating state of a device controlled by a bidirectional remote controller is output from the device to the remote controller, and the operating state is displayed on the remote controller, whereby the operator can confirm the operating state on the remote controller.

Hereinafter, the prior art bidirectional remote control system will be described with reference to FIG. 9.

FIG. 9 is a block diagram illustrating the prior art bidirectional remote control system. In FIG. 9, reference numeral 91 designates a bidirectional remote controller, and this remote controller 91 comprises a selection unit 911, a display unit 912, a central processing unit (CPU) 913, and a bidirectional communication unit 914. Reference numeral 92 designates a device controlled by the bidirectional remote controller 91 (hereinafter, referred to simply as "a controlled device"), and this device 92 comprises a bidirectional communication unit 921 and a controlled device body 922.

A description is given of the operation of the bidirectional remote control system.

First of all, transmission of a command from the bidirectional remote controller 91 to the controlled device 92, such as an air conditioner, is carried out in the same manner as in an ordinary remote control system.

To be specific, when the operator selects a command by the selecting unit 911, the selected command is sent from the selecting unit 911 to the CPU 913, and the CPU 913 instructs the bidirectional communication unit 914 to send an operation request signal corresponding to the command. Receiving this instruction, the bidirectional communication unit 914 sends the operation request signal to the controlled device 92.

The controlled device 92 receives the operation request signal by the bidirectional communication unit 921, and the bidirectional communication unit 921 outputs the operation request signal to the controlled device body 922. Receiving the operation request signal, the controlled device body 922 performs an operation specified by the operation request signal, thereby completing a course of operation. Information relating to the operating state of the controlled device 92, for example, the temperature of the air conditioner in this case, is downloaded from the controlled device 92 to the bidirectional remote controller 91, in the following manner.

Initially, the controlled device body 922 of the controlled device 92 outputs the operating state information to the bidirectional communication unit 921, periodically, or when the operating state changes. On receipt of the operating state information, the bidirectional communication unit 921 sends the information to the bidirectional remote controller 91.

The bidirectional remote controller 91 receives the operating state information by the bidirectional communication unit 914, and outputs it to the CPU 913. Next, the CPU 913 outputs the operating state information to the display unit 912, and the display unit 912 displays the operating state information. For example, when the controlled device 92 is an air conditioner, the bidirectional remote controller 91 receives information such as "temperature—+27° C.", "operating mode—cooling", and "air quantity—strong", and displays the information on the display unit 912. Thereby, the operator can confirm the operating state of the controlled device 92, by the bidirectional remote controller 91, in a place distant from the device 92.

However, the prior art bidirectional remote control system has the following drawbacks.

In the controlled device body 922 of the controlled device 92, the set information, i.e., the information set for the controlled device, is volatile and, furthermore, it is not portable, i.e., information which has been set once cannot be carried and reused for another device.

More specifically, in the prior art bidirectional remote control system, although the operator can confirm the operating state of the controlled device 92 by the bidirectional remote controller 91, when the power to the controlled device 92 is turned off, the operating state and the setting state of the controlled device 92 are reset.

As described above, the operating state and the setting state of the controlled device 92 are volatile and reset when the power to the controlled device 92 is turned off. Therefore, when the power is turned on again, the operating state or the setting state must be set again by using the bidirectional remote controller 91 or the like.

Furthermore, when the user wants to use the same device as that used at home, with the same setting as that at home, in a place where he/she has gone on a travel or the like, the use must set the device again, and this is troublesome. Thus, the setting information of the controlled device is not only volatile but non-portable.

Furthermore, when changing the setting state of the controlled device 92, the bidirectional remote controller 91 and the controlled device 92 must be connected by wire or wireless to set the change in the online state, and this operation is very complicated.

SUMMARY OF THE INVENTION

An object of the present invention is to provide a bidirectional remote control system in which it is not necessary to perform setting again, with respect to the same device controlled by the bidirectional remote controller.

Another object of the present invention is to provide a bidirectional remote control system in which the setting of the remote-controlled device can be changed independently at the bidirectional remote controller side and, furthermore, a plurality of changes can be made at the same time.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a bidirectional remote control system comprising a bidirectional remote controller and a device remote-controlled by the bidirectional remote controller, wherein the remote-controlled device comprises: a device information storage unit for storing device information of the remote-controlled device; a bidirectional communication unit for sending the device information stored in the device information storage unit to the bidirectional remote controller, or receiving the device information sent from the bidirectional remote controller; a controlled device body for receiving an operation request signal from the bidirectional communication unit and performing an operation according to the operation request signal; and the bidirectional remote controller comprises: a device information storage unit for storing the device information of the remote-controlled device; a bidirectional communication unit for receiving the device information sent from the remote-controlled device, or sending the device information stored in the device information storage unit to the remote-controlled device; a selection unit operated by an operator to select and indicate operations to be performed by the bidirectional remote controller and the remote-controlled device; and a central processing unit for controlling the operations of the device information storage unit, the bidirectional communication unit, and the selection unit.

According to a second aspect of the present invention, there is provided a device remote-controlled by a bidirectional remote controller, included in a system comprising the bidirectional remote controller and the remote-controlled device, and the remote-controlled device comprises: a device information storage unit for storing device information of the remote-controlled device; a bidirectional communication unit for sending the device information stored in the device information storage unit to the bidirectional remote controller, or receiving the device information sent from the bidirectional remote controller; and a controlled device body for receiving an operation request signal from the bidirectional communication unit and performing an operation according to the operation request signal.

According to a third aspect of the present invention, there is provided a bidirectional remote controller included in a system comprising the bidirectional remote controller and a device remote-controlled by the bidirectional remote controller, and the bidirectional remote controller comprises: a device information storage unit for storing device information of the remote-controlled device; a bidirectional communication unit for receiving the device information sent from the remote-controlled device, or sending the device information stored in the device information storage unit to the remote-controlled device; a selection unit operated by an operator to select and indicate operations to be performed by the bidirectional remote controller and the remote-controlled device; and a central processing unit for controlling the operations of the device information storage unit, the bidirectional communication unit, and the selection unit.

According to a fourth aspect of the present invention, there is provided a bidirectional remote control system comprising a bidirectional remote controller and a plurality of devices remote-controlled by the bidirectional remote controller, wherein each of the remote-controlled devices comprises: a device information storage unit for storing device information of the remote-controlled device; a bidirectional communication unit for sending the device information stored in the device information storage unit to the bidirectional remote controller, or receiving the device information sent from the bidirectional remote controller; a controlled device body for receiving an operation request signal from the bidirectional communication unit and performing an operation according to the operation request signal; and the bidirectional remote controller comprises: a device information storage unit for storing the device information of the remote-controlled devices; a bidirectional communication unit for receiving the device information sent from the remote-controlled devices, or sending the device information stored in the device information storage unit to the remote-controlled devices; a selection unit operated by an operator to select and indicate operations to be performed by the bidirectional remote controller and the remote-controlled devices; and a central processing unit for controlling the operations of the device information storage unit, the bidirectional communication unit, and the selection unit.

According to a fifth aspect of the present invention, there is provided a plurality of devices remote-controlled by a bidirectional remote controller, included in a system comprising the bidirectional remote controller and the remote-controlled devices, and each of the remote-controlled devices comprises: a device information storage unit for storing device information of the remote-controlled device; a bidirectional communication unit for sending the device information stored in the device information storage unit to the bidirectional remote controller, or receiving the device information sent from the bidirectional remote controller; and a controlled device body for receiving an operation request signal from the bidirectional communication unit and performing an operation according to the operation request signal.

According to a sixth aspect of the present invention, there is provided a bidirectional remote controller included in a system comprising the bidirectional remote controller and a plurality of devices controlled by the bidirectional remote controller, and the bidirectional remote controller comprises: a device information storage unit for storing device information of the remote-controlled devices; a bidirectional communication unit for receiving the device information sent from one of the remote-controlled devices, or sending the device information stored in the device information storage unit to one of the remote-controlled devices; a selection unit operated by an operator to select and indicate operations to be performed by the bidirectional remote controller and the remote-controlled devices; and a central processing unit for controlling the operations of the device information storage unit, the bidirectional communication unit, and the selection unit.

In the above-described first to sixth aspects of the invention, device information such as device setting information is stored in the bidirectional remote controller, and the device information stored in the remote controller is uploaded to the device controlled by the remote controller. Therefore, it is possible to solve the problem of volatility of device information, and realize portability of device information as well as information exchange between a plurality of devices controlled by the remote controller.

According to a seventh aspect of the present invention, there is provided a bidirectional remote control system comprising a bidirectional remote controller and a device remote-controlled by the bidirectional remote controller, wherein the remote-controlled device comprises: a device information storage unit for storing device information of the remote-controlled device; a bidirectional communication unit for sending the device information stored in the device information storage unit to the bidirectional remote controller, or receiving the device information sent from the bidirectional remote controller; a controlled device body for receiving an operation request signal from the bidirectional communication unit and performing an operation according to the operation request signal; and the bidirectional remote controller comprises: a timer unit; a device information storage unit for storing the device information of the remote-controlled device; a bidirectional communication unit for receiving the device information sent from the remote-controlled device, or sending the device information stored in the device information storage unit to the remote-controlled device; a selection unit operated by an operator to select and indicate operations to be performed by the bidirectional remote controller and the remote-controlled device; and a central processing unit for controlling the operations of the device information storage unit, the bidirectional communication unit, and the selection unit.

According to an eighth aspect of the present invention, there is provided a bidirectional remote controller included in a system comprising the bidirectional remote-controller and a device remote-controlled by the bidirectional remote controller, and the bidirectional remote controller comprises: a timer unit; a device information storage unit for storing device information of the remote-controlled device; a bidirectional communication unit for receiving the device information sent from the remote-controlled device, or sending the device information stored in the device information storage unit to the remote-controlled device; a selection unit operated by an operator to select and indicate operations to be performed by the bidirectional remote controller and the remote-controlled device; and a central processing unit for controlling the operations of the device information storage unit, the bidirectional communication unit, and the selection unit.

According to a ninth aspect of the present invention, there is provided a bidirectional remote control system comprising a bidirectional remote controller and a plurality of devices remote-controlled by the bidirectional remote controller, wherein each of the remote-controlled devices comprises: a device information storage unit for storing device information of the remote-controlled device; a bidirectional communication unit for sending the device information stored in the device information storage unit to the bidirectional remote controller, or receiving the device information sent from the bidirectional remote controller; a controlled device body for receiving an operation request signal from the bidirectional communication unit and performing an operation according to the operation request signal; and the bidirectional remote controller comprises: a timer unit; a device information storage unit for storing the device information of the remote-controlled devices; a bidirectional communication unit for receiving the device information sent from the remote-controlled devices, or sending the device information stored in the device information storage unit to the remote-controlled devices; a selection unit operated by an operator to select and indicate operations to be performed by the bidirectional remote controller and the remote-controlled devices; and a central processing unit for controlling the operations of the device information storage unit, the bidirectional communication unit, and the selection unit.

According to a tenth aspect of the present invention, there is provided a bidirectional remote controller included in a system comprising the bidirectional remote controller and a plurality of devices remote-controlled by the bidirectional remote controller, and the bidirectional remote controller comprises: a timer unit; a device information storage unit for storing device information of the remote-controlled devices; a bidirectional communication unit for receiving the device information sent from the remote-controlled devices, or sending the device information stored in the device information storage unit to the remote-controlled devices; a selection unit operated by an operator to select and indicate operations to be performed by the bidirectional remote controller and the remote-controlled devices; and a central processing unit for controlling the operations of the device information storage unit, the bidirectional communication unit, and the selection unit.

According to an eleventh aspect of the present invention, there is provided a bidirectional remote control system comprising a bidirectional remote controller and a device remote-controlled by the bidirectional remote controller, wherein the remote-controlled device comprises: a device information storage unit for storing device information of the remote-controlled device, and operation information for creating an operational environment of the remote-controlled device; a bidirectional communication unit for sending the device information stored in the device information storage unit to the bidirectional remote controller, or receiving the device information sent from the bidirectional remote controller; a controlled device body for receiving an operation request signal from the bidirectional communication unit and performing an operation according to the operation request signal; and the bidirectional remote controller comprises: a device information storage unit for storing the device information of the remote-controlled device, and the operation information for creating the operational environment of the remote-controlled device; a bidirectional communication unit for sending the device information stored in the device information storage unit to the remote-controlled device, or receiving the device information sent from the remote-controlled device; a selection unit operated by an operator to select and indicate operations to be performed by the bidirectional remote controller and the remote-controlled device; a display unit for receiving the device information and the operation information of the remote-controlled device, from the device information storage unit, and displaying the operational environment of the remote-controlled device; and a central processing unit for controlling the operations of the device information storage unit, the bidirectional communication unit, and the selection unit.

According to a twelfth aspect of the present invention, there is provided a bidirectional remote controller included in a system comprising the bidirectional remote controller and a device remote-controlled by the bidirectional remote controller, and the bidirectional remote controller comprises: a device information storage unit for storing device information of the remote-controlled device, and operation information for creating an operational environment of the remote-controlled device; a bidirectional communication unit for sending the device information stored in the device information storage unit to the remote-controlled device, or receiving the device information sent from the remote-controlled device; a selection unit operated by an operator to select and indicate operations to be performed by the bidirectional remote controller and the remote-controlled device; a display unit for receiving the device information and the operation information of the remote-controlled device, from the device information storage unit, and displaying the operational environment of the remote-controlled device; and a central processing unit for controlling the operations of the device information storage unit, the bidirectional communication unit, and the selection unit.

According to a thirteenth aspect of the present invention, there is provided a bidirectional remote control system comprising a bidirectional remote controller and a plurality of devices remote-controlled by the bidirectional remote controller, wherein each of the remote-controlled devices comprises: a device information storage unit for storing device information of the remote-controlled device, and operation information for creating an operational environment of the remote-controlled device; a bidirectional communication unit for sending the device information stored in the device information storage unit to the bidirectional remote controller, or receiving the device information sent from the bidirectional remote controller; a controlled device body for receiving an operation request signal from the bidirectional communication unit and performing an operation according to the operation request signal; and the bidirectional remote controller comprises: a device information storage unit for storing the device information of the remote-controlled devices, and the operation information for creating the operational environments of the remote-controlled devices; a bidirectional communication unit for sending the device information stored in the device information storage unit to the remote-controlled devices, or receiving the device information sent from the remote-controlled devices; a selection unit operated by an operator to select and indicate operations to be performed by the bidirectional remote controller and the remote-controlled devices; a display unit for receiving, from the device information storage unit, the device information and the operation information of one of the plural remote-controlled devices specified by the selection unit, and displaying the operational environment of the remote-controlled device; and a central processing unit for controlling the operations of the device information storage unit, the bidirectional communication unit, and the selection unit.

According to a fourteenth aspect of the present invention, there is provided a bidirectional remote controller included in a system comprising the bidirectional remote controller and a plurality of devices remote-controlled by the bidirectional remote controller, and the bidirectional remote controller comprises: a device information storage unit for storing device information of the remote-controlled devices, and operation information for creating operational environments of the remote-controlled devices; a bidirectional communication unit for sending the device information stored in the device information storage unit to the remote-controlled devices, or receiving the device information sent from the remote-controlled devices; a selection unit operated by an operator to select and indicate operations to be performed by the bidirectional remote controller and the remote-controlled devices; a display unit for receiving, from the device information storage unit, the device information and the operation information of one of the plural remote-controlled devices specified by the selection unit, and displaying the operational environment of the remote-controlled device; and a central processing unit for controlling the operations of the device information storage unit, the bidirectional communication unit, and the selection unit.

According to a fifteenth aspect of the present invention, there is provided a bidirectional remote control system comprising a bidirectional remote controller and a device remote-controlled by the bidirectional remote controller, wherein the remote-controlled device comprises: a device information storage unit for storing device information of the remote-controlled device, and operation information for creating an operational environment of the remote-controlled device; a bidirectional communication unit for sending the device information or the operation information stored in the device information storage unit to the bidirectional remote controller, or receiving the device information sent from the bidirectional remote controller; a controlled device body for receiving an operation request signal from the bidirectional communication unit and performing an operation according to the operation request signal; and the bidirectional remote controller comprises: a timer unit; a device information storage unit for storing the device information of the remote-controlled device, and the operation information for creating the operational environment of the remote-controlled device; a bidirectional communication unit for sending the device information stored in the device information storage unit to the remote-controlled device, or receiving the device information sent from the remote-controlled device; a selection unit operated by an operator to select and indicate operations to be performed by the bidirectional remote controller and the remote-controlled device; a display unit for receiving the device information and the operation information of the remote-controlled device, from the device information storage unit, and displaying the operational environment of the remote-controlled device; and a central processing unit for controlling the operations of the device information storage unit, the bidirectional communication unit, and the selection unit.

According to a sixteenth aspect of the present invention, there is provided a bidirectional remote controller included in a system comprising the bidirectional remote controller and a device remote-controlled by the bidirectional remote controller, and the bidirectional remote controller comprises: a timer unit; a device information storage unit for storing device information of the remote-controlled device, and operation information for creating an operational environment of the remote-controlled device; a bidirectional communication unit for sending the device information stored in the device information storage unit to the remote-controlled device, or receiving the device information sent from the remote-controlled device; a selection unit operated by an operator to select and indicate operations to be performed by the bidirectional remote controller and the remote-controlled device; a display unit for receiving the device information and the operation information of the remote-controlled device, from the device information storage unit, and displaying the operational environment of the remote-controlled device; and a central processing unit for controlling the operations of the device information storage unit, the bidirectional communication unit, and the selection unit.

According to a seventeenth aspect of the present invention, there is provided a bidirectional remote control system comprising a bidirectional remote controller and a plurality of devices remote-controlled by the bidirectional remote controller, wherein each of the remote-controlled devices comprises: a device information storage unit for storing device information of the remote-controlled device, and operation information for creating an operational environment of the remote-controlled device; a bidirectional communication unit for sending the device information or the operation information stored in the device information storage unit to the bidirectional remote controller, or receiving the device information sent from the bidirectional remote controller; a controlled device body for receiving an operation request signal from the bidirectional communication unit and performing an operation according to the operation request signal; and the bidirectional remote controller comprises: a timer unit; a device information storage unit for storing the device information of the remote-controlled devices, and the operation information for creating the operational environments of the remote-controlled devices; a bidirectional communication unit for sending the device information stored in the device information storage unit to the remote-controlled devices, or receiving the device information sent from the remote-controlled devices; a selection unit operated by an operator to select and indicate operations to be performed by the bidirectional remote controller and the remote-controlled device; a display unit for receiving the device information and the operation information of one of the plural remote-controlled devices specified by the selection unit, from the device information storage unit, and displaying the operational environment of the remote-controlled device; and a central processing unit for controlling the operations of the device information storage unit, the bidirectional communication unit, and the selection unit.

According to an eighteenth aspect of the present invention, there is provided a bidirectional remote controller included in a system comprising the bidirectional remote controller and a plurality of devices remote-controlled by the bidirectional remote controller, and the bidirectional remote controller comprises: a timer unit; a device information storage unit for storing device information of the remote-controlled devices, and operation information for creating operational environments of the remote-controlled devices; a bidirectional communication unit for sending the device information stored in the device information storage unit to the remote-controlled devices, or receiving the device information sent from the remote-controlled devices; a selection unit operated by an operator to select and indicate operations to be performed by the bidirectional remote controller and the remote-controlled device; a display unit for receiving the device information and the operation information of one of the plural remote-controlled devices specified by the selection unit, from the device information storage unit, and displaying the operational environment of the remote-controlled device; and a central processing unit for controlling the operations of the device information storage unit, the bidirectional communication unit, and the selection unit.

In the above-described seventh to eighteenth aspects of the invention, device information such as device setting information is stored in the bidirectional remote controller, and the stored device information is transmitted to the remote-controlled device at a time specified by the timer of the remote controller to set the device information in the device. Therefore, timer reservation function is realized in a device having no such function by the bidirectional remote controller.

According to a nineteenth aspect of the present invention, there is provided a bidirectional remote control system comprising a bidirectional remote controller and a device remote-controlled by the bidirectional remote controller, wherein the remote-controlled device comprises: a device information storage unit for storing device information of the remote-controlled device; a bidirectional communication unit for sending the device information stored in the device information storage unit to the bidirectional remote controller, or receiving the device information sent from the bidirectional remote controller; a controlled device body for receiving an operation request signal from the bidirectional communication unit and performing an operation according to the operation request signal; and the bidirectional remote controller comprises: a device information storage unit for storing the device information of the remote-controlled device; a bidirectional communication unit for receiving the device information sent from the remote-controlled device, or sending the device information stored in the device information storage unit to the remote-controlled device; and a central processing unit for controlling the operations of the device information storage unit and the bidirectional communication unit, and reconfiguring the device information stored in the device information storage unit.

According to a twentieth aspect of the present invention, there is provided a bidirectional remote controller included in a system comprising the bidirectional remote controller and a device remote-controlled by the bidirectional remote controller, and the bidirectional remote controller comprises: a device information storage unit for storing device information of the remote-controlled device; a bidirectional communication unit for receiving the device information sent from the remote-controlled device, or sending the device information stored in the device information storage unit to the remote-controlled device; and a central processing unit for controlling the operations of the device information storage unit and the bidirectional communication unit, and reconfiguring the device information stored in the device information storage unit.

According to a twenty-first aspect of the present invention, there is provided a bidirectional remote control system comprising a bidirectional remote controller and a plurality of devices remote-controlled by the bidirectional remote controller, wherein each of the remote-controlled device comprises: a device information storage unit for storing device information of the remote-controlled device; a bidirectional communication unit for sending the device information stored in the device information storage unit to the bidirectional remote controller, or receiving the device information sent from the bidirectional remote controller; a controlled device body for receiving an operation request signal from the bidirectional communication unit and performing an operation according to the operation request signal; and the bidirectional remote controller comprises: a device information storage unit for storing the device information of the remote-controlled devices; a bidirectional communication unit for receiving the device information sent from one of the remote-controlled devices, or sending the device information stored in the device information storage unit to one of the remote-controlled devices; and a central processing unit for controlling the operations of the device information storage unit and the bidirectional communication unit, and reconfiguring the device information stored in the device information storage unit.

According to a twenty-second aspect of the present invention, there is provided a bidirectional remote controller included in a system comprising the bidirectional remote controller and a plurality of devices remote-controlled by the bidirectional remote controller, and the bidirectional remote controller comprises: a device information storage unit for storing device information of the remote-controlled devices; a bidirectional communication unit for receiving the device information sent from the remote-controlled devices, or sending the device information stored in the device information storage unit to the remote-controlled devices; and a central processing unit for controlling the operations of the device information storage unit and the bidirectional communication unit, and reconfiguring the device information stored in the device information storage unit.

According to the twenty-third aspect of the present invention, in the bidirectional remote control system of the twenty-first aspect, one of the remote-controlled devices is a program supply unit; the device information output from the remote-controlled device is program guide information; and the device information reconfigured by the bidirectional remote controller and then transmitted is either program selection information or program reservation information.

According to a twenty-fourth aspect of the present invention, in the bidirectional remote controller of the twenty-second aspect, one of the remote-controlled devices is a program supply unit; the device information output from the remote-controlled device is program guide information; and the device information reconfigured by the bidirectional remote controller and then transmitted is either program selection information or program reservation information.

According to a twenty-fifth aspect of the present invention, in the bidirectional remote control system of the twenty-first aspect, one of the remote-controlled devices is either a recording medium or a network interface unit.

According to a twenty-sixth aspect of the present invention, in the bidirectional remote control system of the twenty-first aspect, a first remote-controlled device is a program supply unit; a second remote-controlled device is a program recording unit; the device information output from the first remote-controlled device is program guide information; and the device information reconfigured by the bidirectional remote controller and then transmitted is program reservation information.

In the above-described nineteenth to twenty-sixth aspects of the present invention, device information such as device setting information is stored in the bidirectional remote controller, the device information is edited on the remote controller side, and the edited device information is transmitted to the remote-controlled device to change the setting of the device. Therefore, it is possible to perform a plurality of changes in setting, for example, batch setting of reservation for recording a plurality of programs, in the offline state.

DETAILED DESCRIPTION OF THE PREFERRED EMBODIMENTS

Embodiment 1

A first embodiment of the present invention corresponds to claims 1~3 and relates to a bidirectional remote control system comprising a single bidirectional remote controller and a single device controlled by the bidirectional remote controller (hereinafter referred to simply as a controlled device). The controlled device comprises a bidirectional communication unit and a device information storage unit. The bidirectional communication unit sends device information from the device information storage unit to the bidirectional remote controller when downloading the device information, and it receives the device information from the bidirectional remote controller when uploading the device information and outputs the device information to the device information storage unit. The device information storage unit outputs the device information to the bidirectional communication unit when downloading the device information, and it stores the device information from the bidirectional communication unit when uploading the device information.

Hereinafter, a bidirectional remote control system, a bidirectional remote controller, and a device controlled by the bidirectional remote controller according to the first embodiment of the invention will be described with reference to drawings.

Figure 1:
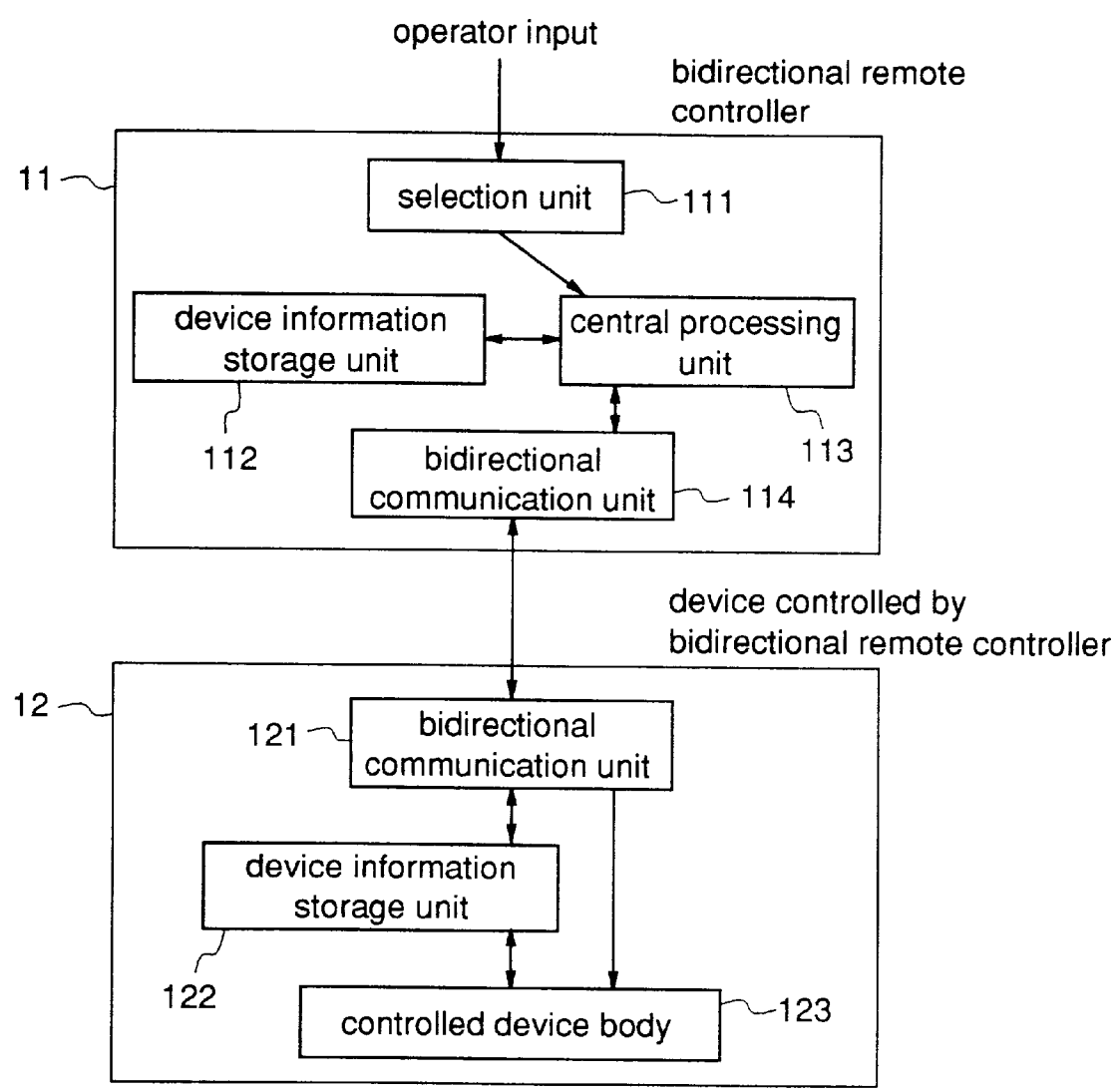
FIG. 1 is a block diagram illustrating a bidirectional remote control system according to a first embodiment of the present invention.

FIG. 1 is a block diagram illustrating a bidirectional remote control system according to the first embodiment. In FIG. 1, reference numeral 11 designates a bidirectional remote controller, and this remote controller 11 comprises a selecting unit 111, a device information storage unit 112, a central processing unit (CPU) 113, and a bidirectional communication unit 114. Reference numeral 12 designates a device controlled by the bidirectional remote controller 11, and this device 12 comprises a bidirectional communication unit 121, an operation information storage unit 122, and a controlled device body 123.

Hereinafter, a description is given of the operation of the bidirectional remote control system so constructed. It is assumed that the device 12 controlled by the bidirectional remote controller 11 is a television.

Figure 2:
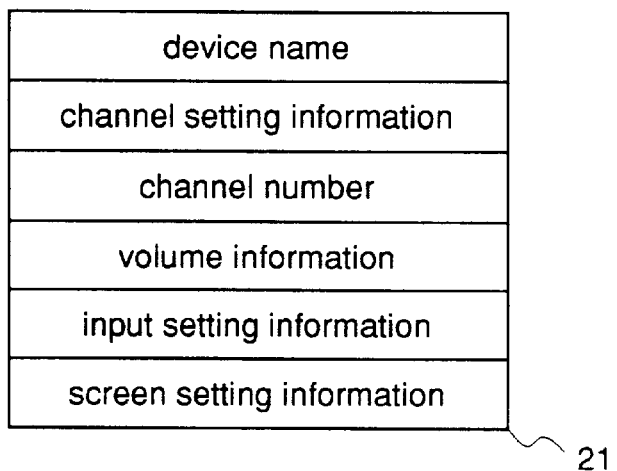
FIG. 2 is a diagram illustrating the structure of device setting information according to the first embodiment.

FIG. 2 is a diagram showing the structure of device setting information according to the first embodiment, and reference numeral 21 denotes a setting information table for the television. As shown in FIG. 2, as the television setting information, there are "name of device", "channel setting information", "channel number", "volume information", "input setting information" and "screen setting information".

In this first embodiment, the television setting information shown in the table 21 is stored in the device information storage unit 122 of the controlled device 12. According to variations in the current operating state of the television, the device setting information is output from the controlled device body 123 to the device information storage unit 122, and the device information storage unit 122 always stores the present device setting information of the television.

The bidirectional remote controller 11 includes the selecting unit 111, and this selecting unit 111 has a download button and an upload button (not shown). When the operator pushes the download button, the device setting information of the television is downloaded to the bidirectional remote controller 11 in the following manner.

The selecting unit 111 sends a signal indicating that the download button is selected, to the CPU 113. Receiving this signal, the CPU 113 instructs the bidirectional communication unit 114 to send a setting information request signal. Receiving this instruction, the bidirectional communication unit 114 sends the setting information request signal to the controlled device 12.

The controlled device 12 receives the setting information request signal and sends it to the bidirectional remote controller 11.

To be specific, in the controlled device 12, the bidirectional communication unit 121 receives the setting information request signal and outputs this signal to the device information storage unit 122. On receipt of the setting information request signal, the device information storage unit 122 outputs the device setting information stored therein to the bidirectional communication unit 121. The bidirectional communication unit 121 sends the device setting information to the bidirectional remote controller 11.

The bidirectional remote controller 11 receives and stores the device setting information. To be specific, in the bidirectional remote controller 11, the bidirectional communication unit 114 receives the device setting information and outputs this information to the CPU 113. The CPU 113 receives the device setting information and outputs this information to the device information storage unit 112, and the device information storage unit 112 stores the device setting information.

According to the above-described operation, the device setting information stored in the controlled device 12 can be downloaded to the bidirectional remote controller 11.

Further, the stored device setting information can be uploaded to the controlled device 12 by the bidirectional remote controller 11, according to a request from the operator, as in the following manner.

When the user selects the upload button of the selecting unit 111 of the bidirectional remote controller 11, the device setting information is sent to the controlled device 12. To be specific, when the upload button is selected, a request to send the device setting information is output to the CPU 113. The CPU 113 outputs this request to the device information storage unit 112. Receiving this request, the device information storage unit 112 outputs the device setting information which has been stored therein, toward the CPU 113. The CPU 113 outputs the device setting information to the bidirectional transmission unit 114, and the bidirectional transmission unit 114 sends the device setting information to the controlled device 12.

The controlled device 12 receives the device setting information and sets this information in the controlled device body 123. To be specific, in the controlled device 12, the bidirectional transmission unit 121 receives the device setting information and outputs this information to the device information storage unit 122, and the device information storage unit 122 stores this information. The controlled device body 123 operates according to the device setting information stored in the storage unit 122.

In accordance with the above-described operation, the device setting state can be temporarily stored and then uploaded to the controlled device 12, by the bidirectional remote controller 11. Thereby, nonvolatile operating state and setting state of the device are realized. Since the operating state and the setting state of the controlled device 12 can be downloaded into the bidirectional remote controller 11, even after the power to the device 12 is turned off, the setting of the device 12 can be recovered to that before turning off the power, by the operator selecting the upload button of the bidirectional remote controller 11 and, therefore, this system is very effective to a device having complicated setting.

When the operator wants to temporarily change the state (setting) of the controlled device 12 and then restore it, the state of the device before being changed is downloaded from the device 12 to the controller 11 to store it in the controller 11. After the operator has changed the state of the device 12 and used the device 12, the state of the device before the change is uploaded from the controller 11 to the device 12 to restore the device 12 into the state before the change.

Further, in the case where a plurality of users want to change the setting of a device respectively, if the setting is complicated, it is troublesome for a user to set the device to his/her own setting after the other user has used the device. However, when these users have their own bidirectional remote controllers according to this first embodiment, since they can store their own settings in the bidirectional remote controllers, such complicated setting of the device by each user is disposed with.

If the downloading of the operating state information to the bidirectional remote controller 11 and the uploading of this information from the bidirectional remote controller 11 are carried out when the operator turns off or on the power, the downloading of the operating state information and the setting state information to the bidirectional remote controller and the uploading of these information to the controlled device can be carried out with less operation.

While in this first embodiment the operation of the bidirectional remote control system is described for the case where the setting information of a single device is stored in a single bidirectional remote controller, it is also possible to store setting information of a plurality of devices by using a single bidirectional remote controller. Further, it is also possible to upload or download the setting information of a plurality of devices at the same time by one-time button operation. For example, the setting information of devices put in different rooms can be stored in a single bidirectional remote controller to control these device.

Embodiment 2

A second embodiment of the present invention corresponds to claims 4~6 and relates to a bidirectional remote control system comprising a single bidirectional remote controller and a plurality of devices controlled by the remote controller, wherein information is exchanged between the controlled devices through the remote controller.

Hereinafter, a bidirectional remote control system, a bidirectional remote controller, and devices controlled by the remote controller according to this second embodiment will be described with reference to drawings.

Figure 3:
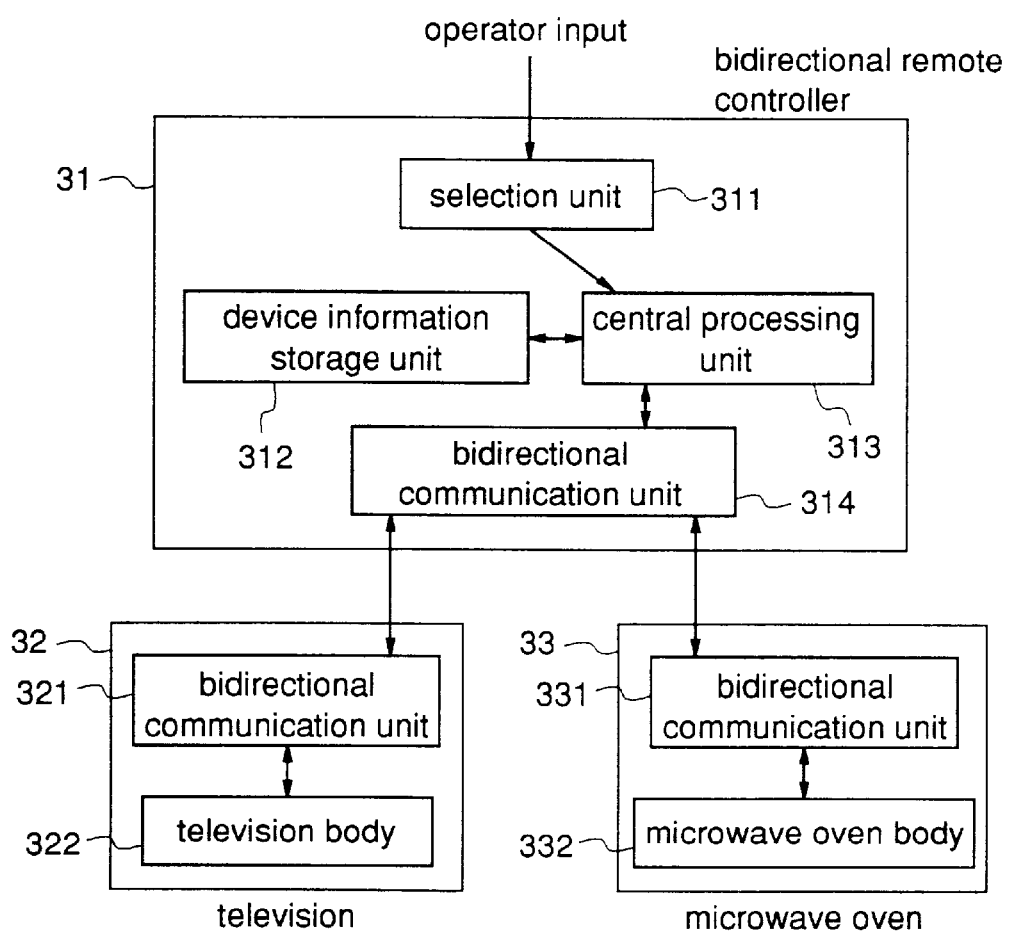
FIG. 3 is a block diagram illustrating a bidirectional remote control system according to a second embodiment of the present invention.

FIG. 3 is a block diagram illustrating a bidirectional remote control system according to the second embodiment. In FIG. 3, reference numeral 31 designates a bidirectional remote controller comprising a selecting unit 311, a device information storage unit 312, a central processing unit (CPU) 313, and a bidirectional communication unit 314. Reference numeral 32 designates a television comprising a bidirectional communication unit 321 and a television body 322, and reference numeral 33 designates a microwave oven comprising a bidirectional communication unit 331 and a microwave oven body 332.

Hereinafter, a description is given of the operation of the bidirectional remote control system constructed as described above.

In this second embodiment, it is premised that a cooking program is broadcast on the television 32, and information for setting the microwave oven 33 to cook the dish being broadcast is multiplexed into the information of this program. The operation of sending the information for setting the microwave oven from the television 32 to the microwave oven 33 through the bidirectional remote controller 31 to store it in the microwave oven 33 is as follows.

When the operator wants to download the microwave oven setting information, initially, the setting information is stored in the bidirectional remote controller 31 in the following manner.

When the television body 322 of the television 32 detects that information which is downloadable into the microwave oven 33 is multiplexed in the broadcast signal of the cooking program, "microwave oven information downloadable" is displayed on the screen of the television 32.

The operator of the bidirectional remote controller 31, who knows that the microwave oven information is downloadable, selects a download button (not shown) mounted on the selecting unit 311 of the bidirectional remote controller 31. At this time, a download request signal is output from the selecting unit 311 to the CPU 313, and the CPU 313 outputs this signal to the bidirectional communication unit 314. The bidirectional communication unit 314 receives the download request signal and sends it to the television 32.

In the television 32, the bidirectional communication unit 321 receives the download request signal and outputs it to the television body 322. On receipt of the download request signal, the television body 322 outputs the microwave oven setting information which is multiplexed in the program toward the bidirectional communication unit 321, and the bidirectional communication unit 321 sends this information to the bidirectional remote controller 31.

Figure 4:
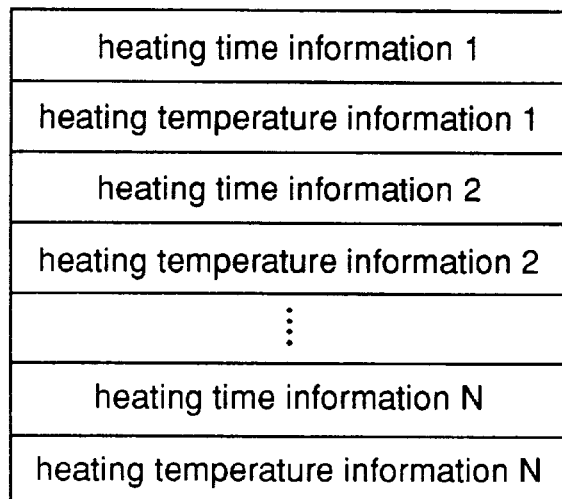
FIG. 4 is a diagram illustrating the structure of device setting information according to the second embodiment.

FIG. 4 is a diagram illustrating an example of device setting information according to this second embodiment, wherein reference numeral 41 designates microwave oven setting information. In this example, heating time and heating temperature to be set in the microwave oven are alternately arranged.

The bidirectional remote controller 31 stores such microwave oven setting information in the following manner. In the bidirectional remote controller 31, the bidirectional communication unit 314 receives the microwave oven setting information transmitted from the television 32, and outputs it to the CPU 313. Then, the CPU 313 outputs the microwave oven setting information to the device information storage unit 312, and the storage unit 312 stores the microwave oven setting information.

Next, the bidirectional remote controller 31 can upload the microwave oven setting information to the microwave oven 33 according to a request of the operator.

When the microwave oven setting information is downloaded to the bidirectional remote controller 31, the operator selects (pushes) an upload button (not shown) on the bidirectional remote controller 31 with the controller 31 being directed to the microwave oven 33. When the upload button is selected, the selecting unit 311 outputs an upload request signal to the CPU 313, and the CPU 313 instructs the device information storage unit 312 to output the microwave oven setting information. On receipt of the instruction, the storage unit 312 outputs the microwave oven setting information to the CPU 313. The CPU 313 receives the microwave oven setting information and outputs it to the bidirectional communication unit 314, and the bidirectional communication unit 314 sends the microwave oven setting information to the microwave oven 33.

In the microwave oven 33, the bidirectional communication unit 331 receives the microwave oven setting information and outputs it to the microwave oven body 332. The microwave oven body 332 is set in the state indicated by the microwave oven setting information.

As described above, through the mediation of the bidirectional remote controller 31, the microwave oven setting information broadcast by the television 32 can be set in the microwave oven 33.

While in this second embodiment a television and a microwave oven are employed as devices exchanging information, the present invention is also effective to combinations of any other devices having information to exchange.

For example, there is a case where information of teletext is transferred from a television to a personal computer. Thus, the bidirectional remote controller according to this second embodiment can be widely used for mediating complicated information between plural devices.

While the second embodiment is described for the case of exchanging information between a plurality of devices disposed in the same room, the present invention is also effective in the case of exchanging information with a device disposed outside the room, for example, a device in the place where the user has gone.

Embodiment 3

A third embodiment of the present invention corresponds to claims 4~6 and relates to a bidirectional remote control system used in the case of exchanging information between a device disposed inside a room and a device disposed outside the room.

Hereinafter, a bidirectional remote control system according to this third embodiment will be described with reference to drawings.

Figure 5:
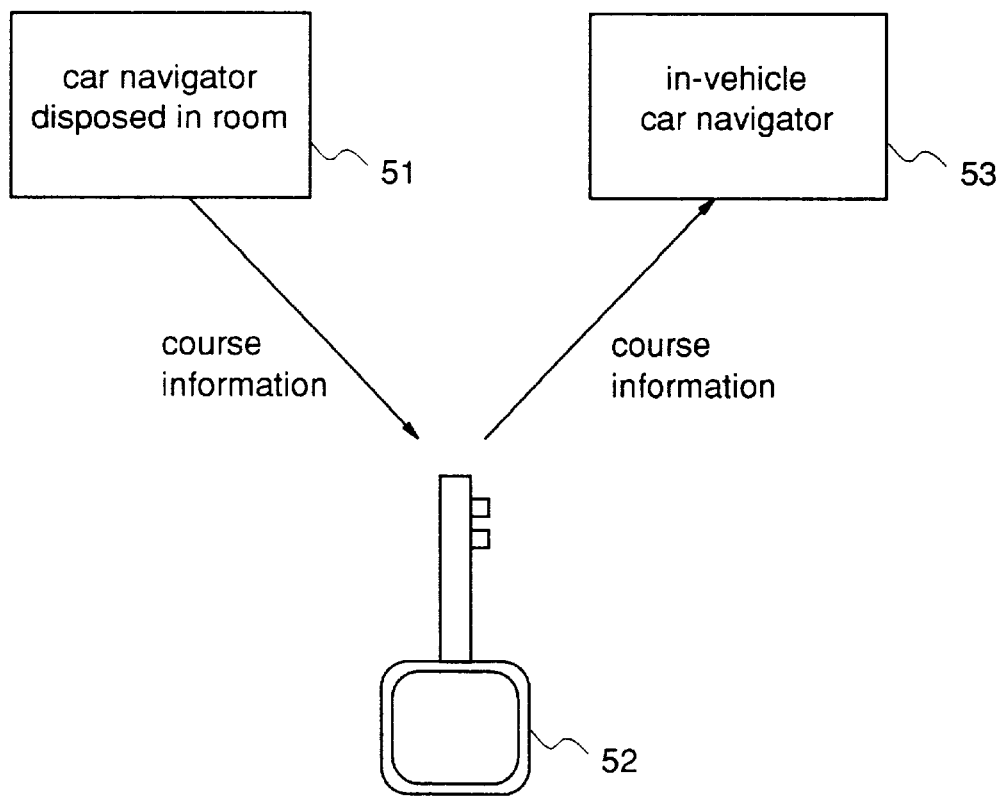
FIG. 5 is a block diagram illustrating a bidirectional remote control system according to a third embodiment of the present invention.

FIG. 5 is a block diagram illustrating a bidirectional remote control system according to the third embodiment. In the figure, reference numeral 51 designates a car navigator which is disposed inside the room, numeral 52 designates a key type bidirectional remote controller, and numeral 53 designates an in-vehicle car navigator.

When the device information can be stored in the key type bidirectional remote controller 52 as in the first and second embodiments, course information which has previously been set in the car navigator 51 disposed in the room can be downloaded into the key type bidirectional remote controller 52 and then uploaded into the in-vehicle car navigator 53.

Figure 6:
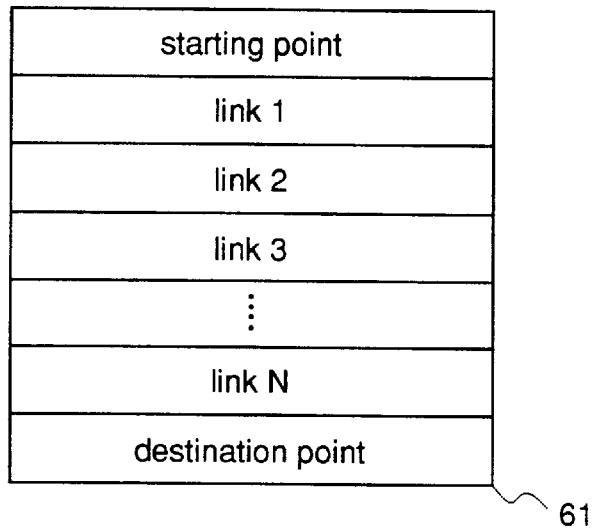
FIG. 6 is a diagram for explaining an example of course setting information.

FIG. 6 is a diagram illustrating an example of course setting information 61 according to this third embodiment. The course setting information comprises the starting point, the destination point, and a plurality of link information indicating the road connecting these points. The course setting information as shown in FIG. 6 is downloaded to the bidirectional remote controller 52 and then uploaded to the in-vehicle car navigator.

Uploading and downloading of the course setting information are carried out in similar manner to those described for the second embodiment.

In this third embodiment, complicated course setting into the car navigator can be performed not in the car but in the room in advance, and the course information so set can be easily carried into the car.

Embodiment 4

A fourth embodiment of the present invention corresponds to claims 7~18 and relates to a bidirectional remote control system according to any of the first to third embodiments, in which the bidirectional remote controller has a reservation function using a timer (hereinafter referred to simply as a timer reservation function). The bidirectional remote controller of this fourth embodiment includes a timer unit and a display unit in addition to the structure of the aforementioned embodiments. The timer unit instructs the device information storage unit to output the device information at a time which has been set by the operator. The device information storage unit stores the device information transmitted from the bidirectional communication unit, and outputs the device information to the bidirectional communication unit when it receives the instruction from the timer unit. Further, the display unit displays a plurality of operational environments of the controlled device from the device information storage unit.

Hereinafter, a bidirectional remote control system, a bidirectional remote controller, and a device controlled by the bidirectional remote controller according to this fourth embodiment will be described with reference to figures.

Figure 7:
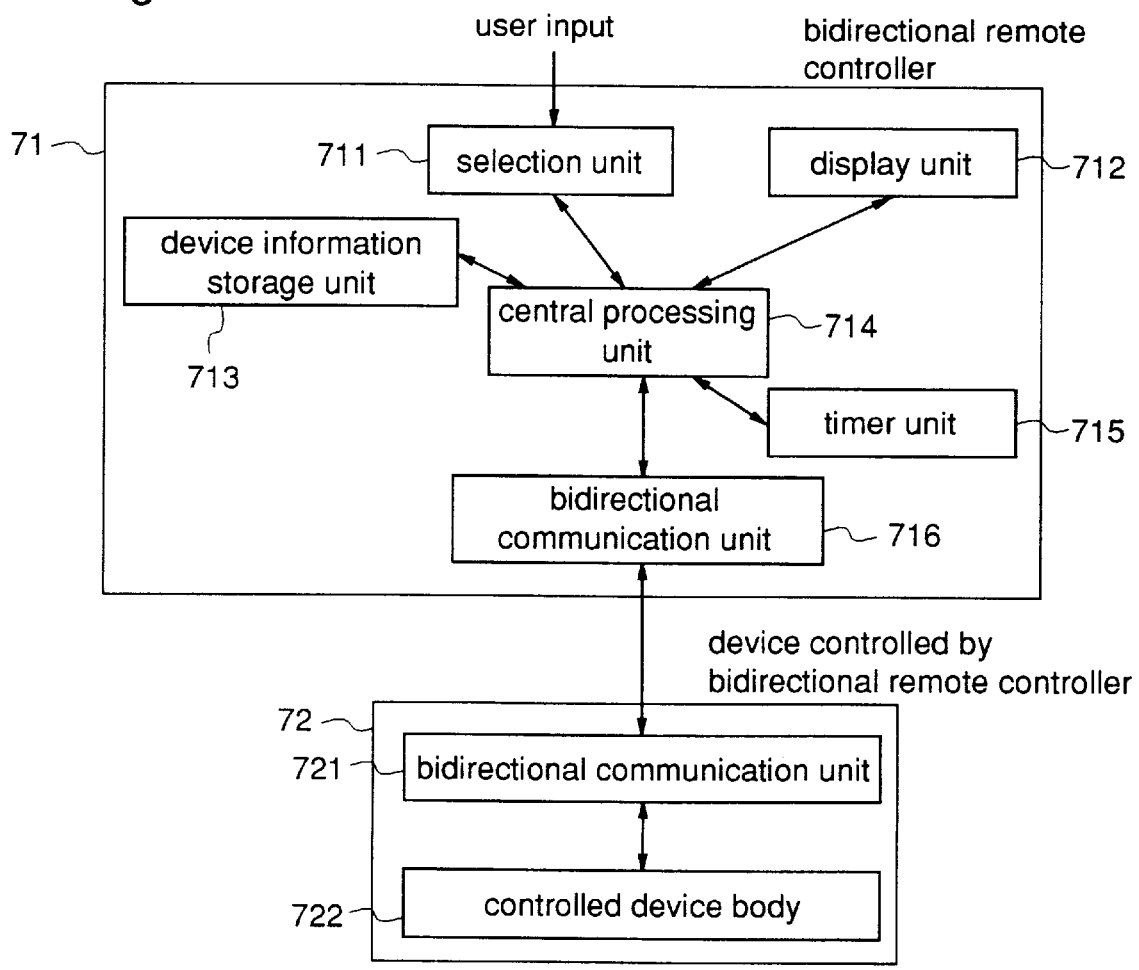
FIG. 7 is a block diagram illustrating a bidirectional remote control system according to a fourth embodiment of the present invention.

FIG. 7 is a block diagram illustrating a bidirectional remote control system according to the fourth embodiment. In FIG. 7, reference numeral 71 designates a bidirectional remote controller comprising a selecting unit 711, a display unit 712, a device information storage unit 713, a central processing unit (CPU) 714, a timer unit 715, and a bidirectional communication unit 716. Reference numeral 72 designates a device controlled by the bidirectional remote controller 71, and this device comprises a bidirectional communication unit 721 and a controlled device body 722. In this fourth embodiment, it is assumed that the controlled device 72 is an air conditioner.

A description is given of the operation of the bidirectional remote control system.

The bidirectional remote controller 71 can download the device setting information from the remote-controlled device 72. This downloading of the device setting information can be carried out in similar manner to that described for the first embodiment.

Further, the downloaded setting information of the controlled device 72 can be displayed on the display unit 712, for the operator. Accordingly, the operator can change the setting state of the controlled device 72 by operating the bidirectional remote controller 72 while seeing the setting state of the controlled device 72 on the display unit 712.

Next, a description is given of the reservation function implemented in the bidirectional remote control system of this fourth embodiment.

Initially, examples of operational environments of the bidirectional remote controller 71 will be described with reference to FIG. 8.

Figure 8:
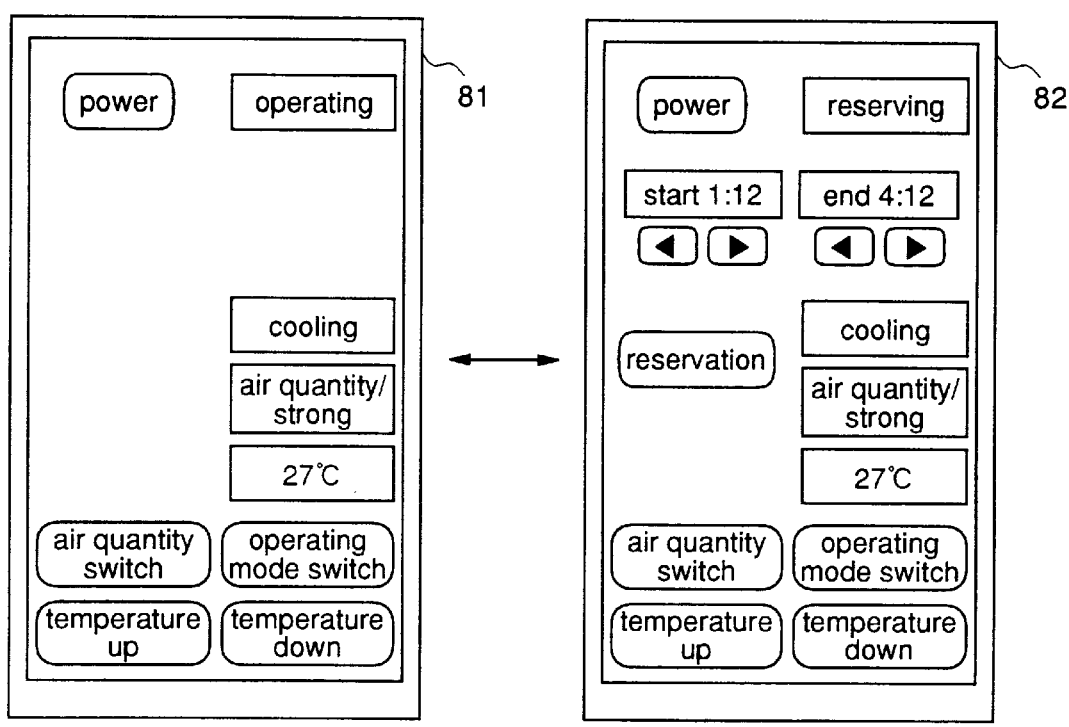
FIG. 8 is a diagram for explaining examples of operational environments according to the fourth embodiment.
Figure 9:
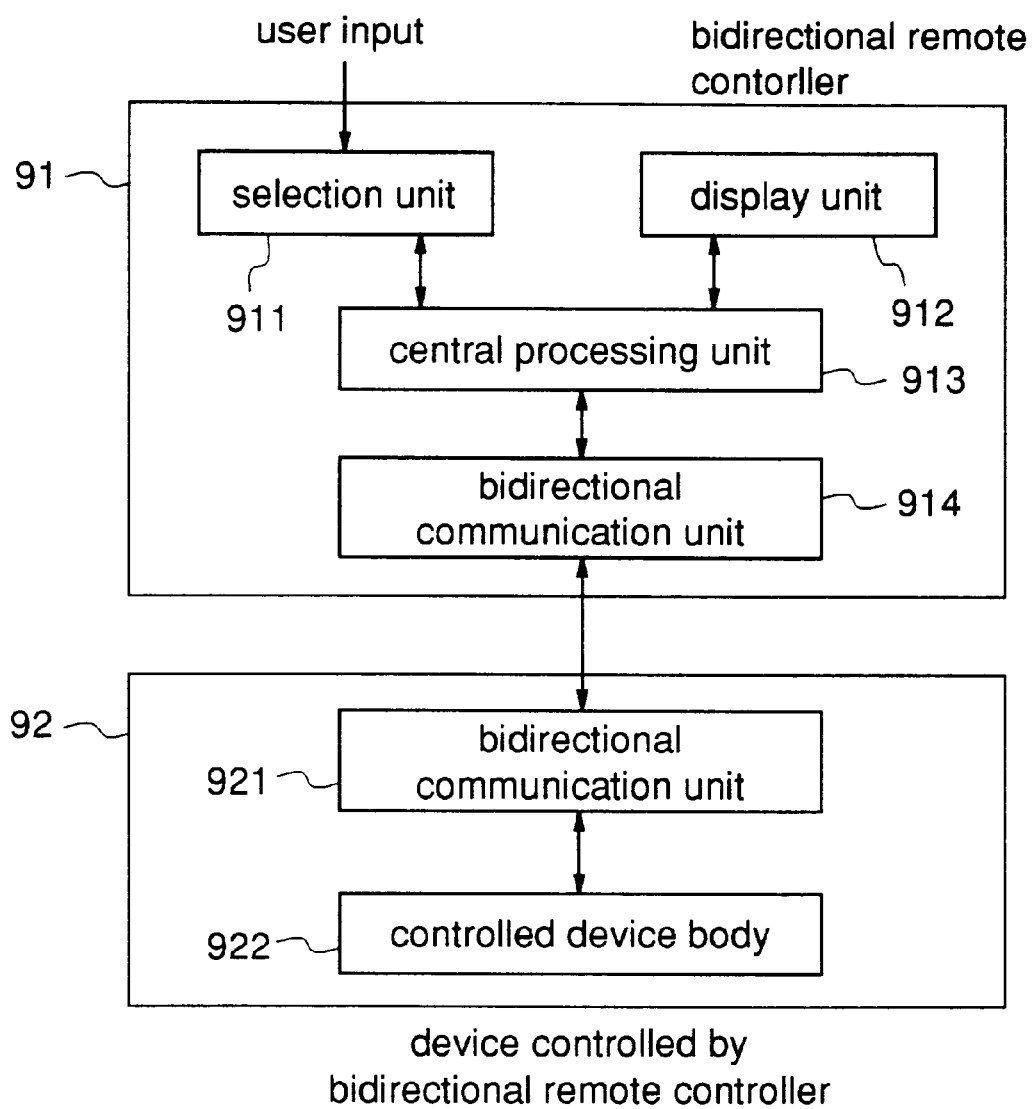
FIG. 9 is a block diagram illustrating a bidirectional remote control system according to the prior art.

FIG. 8 is a diagram for explaining examples of operational environments of the bidirectional remote controller 71, wherein reference numeral 81 designates an operational environment in the normal operation, and reference numeral 82 designates an operational environment in the reserving operation.

In FIG. 8, a touch panel of an LCD (Liquid Crystal Display) gives the operational environment to the operator, and the operator touches a button displayed on the LCD to select a command displayed on the button. Further, the operator can change the display of the LCD as desired. In the operational environment 81 in the normal operation, the power is switched between ON and OFF by the "power" button, the quantity of air is switched between strong and weak by the "air quantity switch" button, the operating mode is switched between cooling and heating by the "operating mode switch" button, and the temperature is adjusted by the "temperature up" button and the "temperature down" button. Further, in the middle of the right side of the operational environment 81, "cooling", "air quantity—strong", and "27° C." indicate the present setting state of the air conditioner. Further, "operating" which is displayed at the upper right side of the operational environment 81 indicates that the bidirectional remote controller is in the normal command sending state, and the bidirectional remote controller 81 goes into the reservation mode when the operator selects this button.

In the operational environment 82 of the reservation mode, the mode display at the upper-right side shows "reserving" while it shows "operating" in the operational environment 81.

The operator makes reservation for two terms, "operation time" and "device state".

In the middle of the operational environment 82, "start 1:12" and "end 4:12" indicate the reserved start time and the reserved end time, respectively, and these times can be adjusted by the arrow buttons beneath the displays.

With respect to the device state, the operator sets the device state information (operating mode, air quantity, and temperature) displayed on the bidirectional remote controller 72 to the device state he/she wants to reserve, by the "air quantity switch" button, the "operating mode switch" button, and the "temperature up" and "temperature down" buttons, respectively.

After setting the operation time and the device state as described above, the operator selects the "reservation" button, whereby the reservation is completed and the bidirectional remote controller returns to the normal operating mode 81.

The bidirectional remote controller 71 provides the operator with the above-described operational environments by using the selecting unit 711 and the display unit 712.

When the operator has made the reservation, the reserved time information output from the CUP 714 is stored in the timer unit 715, and the reserved device setting information output from the CPU 714 is stored in the device information storage unit 713.

When the start time reserved by the operator has come, the reserved operation is carried out as follows. The timer unit 715 interrupts the CPU 714 and instructs the CPU 714 to start the reserved operation. On receipt of the instruction, the CPU 714 instructs the device information storage unit 713 to output the device setting information reserved by the operator, and the storage unit 713 outputs it to the CPU 714. The CPU 714 outputs the device setting information to the bidirectional communication unit 716 and, further, the bidirectional communication unit 716 sends the device setting information to the controlled device 72. In the example of FIG. 8, the device setting information to be transmitted is as follows: "operating mode—cooling", "air quantity—strong", "set temperature—+27° C.".

In the controlled device 72, the reserved device setting information is received by the bidirectional communication unit 721 and then output to the controlled device body 722, whereby the device body 722 is set in the state reserved by the operator.

When the reserved end time has come, a signal instructing the end of the operation is sent from the bidirectional remote controller 71 to the controlled device 72. To be specific, when the reserved end time has come, the timer unit 716 interrupts the CPU 714 and instructs the CPU 714 to end the operation. On receipt of this instruction, the CPU 714 outputs a reserved operation end signal to the bidirectional communication unit 716, and the bidirectional communication unit 716 sends this signal to the controlled device 72.

In the controlled device 72, the reserved operation end signal is received by the bidirectional communication unit 721 and, thereafter, this signal is output to the controlled device body 722, whereby the controlled device 72 ends the operation.

In accordance with the above-described operation, a bidirectional remote control system which enables reservation by the timer of the bidirectional remote controller is realized. This bidirectional remote control system realizes a reservation function in a remote-controlled device having no reservation function. For example, from the reason that a lighting equipment has no display means and it is uneconomical to have a complicated circuit, it is difficult to make a controlled device itself have a reservation function. However, according to the fourth embodiment of the invention, a reservation function is easily realized even in such device.

While in this fourth embodiment a bidirectional remote controller stores and reserves the device setting state of a single device controlled by the remote controller, the present invention is also effective in the case where a bidirectional remote controller stores and reserves the device setting states of a plurality of devices. By that the bidirectional remote controller stores the device setting states of a plurality of devices, and sends the device setting information of these devices simultaneously at a reserved time to these devices to set the information in these devices, it is possible to realize synchronized reservation functions of these devices. For example, when a program reproduced by a set-top box (STB) is recorded by a video recorder, simultaneous reservation in which the STB and the video recorder are synchronized is realized.

While in this fourth embodiment a bidirectional remote control system performing only one reservation is described, the remote control system of this fourth embodiment can deal with a plurality of reservations by setting a plurality of time information in the timer unit.

Embodiment 5

A fifth embodiment of the present invention corresponds to claims 19~20 and relates to a bidirectional remote control system in which the bidirectional remote controller includes a CPU having a function of reconfiguring the device information stored in the device information storage unit, in addition to the structure of the bidirectional remote control system according to the first embodiment.

In this fifth embodiment, the bidirectional remote control system employs, as a controller, a remote controller with an LCD, or a remote controller having a function of providing a graphical user interface, such as a personal digital assistant (PDA). Further, the system employs, as a device controlled by the controller, a set-top box capable of receiving and reproducing satellite broadcasting or cable television broadcasting.

Hereinafter, a bidirectional remote controller, a device controlled by the bidirectional remote controller, and a bidirectional remote control system according to the fifth embodiment will be described with reference to FIGS. 10, 11, and 12.

Figure 10:
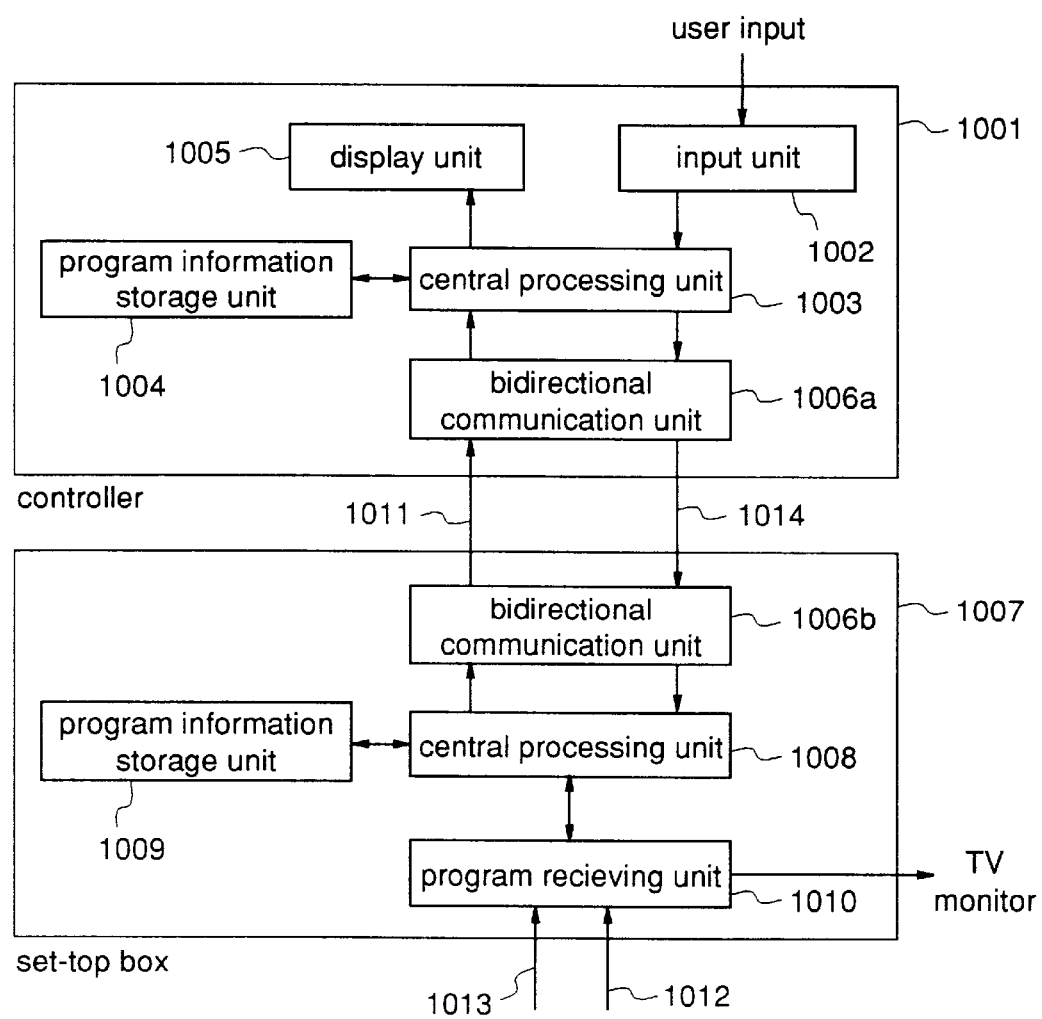
FIG. 10 is a block diagram illustrating a bidirectional remote control system according to a fifth embodiment of the present invention.

FIG. 10 is a block diagram illustrating a bidirectional remote control system according to the fifth embodiment.

In FIG. 10, reference numeral 1001 designates a controller as a bidirectional remote controller, and this controller 1001 comprises an input unit 1002, a central processing unit (CPU) 1003, a program information storage unit 1004, a display unit 1005, and a bidirectional communication unit 1006a. Reference numeral 1007 designates a set-top box as a device controlled by the controller 1001, and this set-top box 1007 comprises a bidirectional communication unit 1006b, a CPU 1008, a program information storage unit 1009, and a program receiving unit 1010. Further, reference numerals 1011 and 1012 designate program information, numeral 1013 designates a program, and numeral 1014 designates program selection information.

Figure 11:
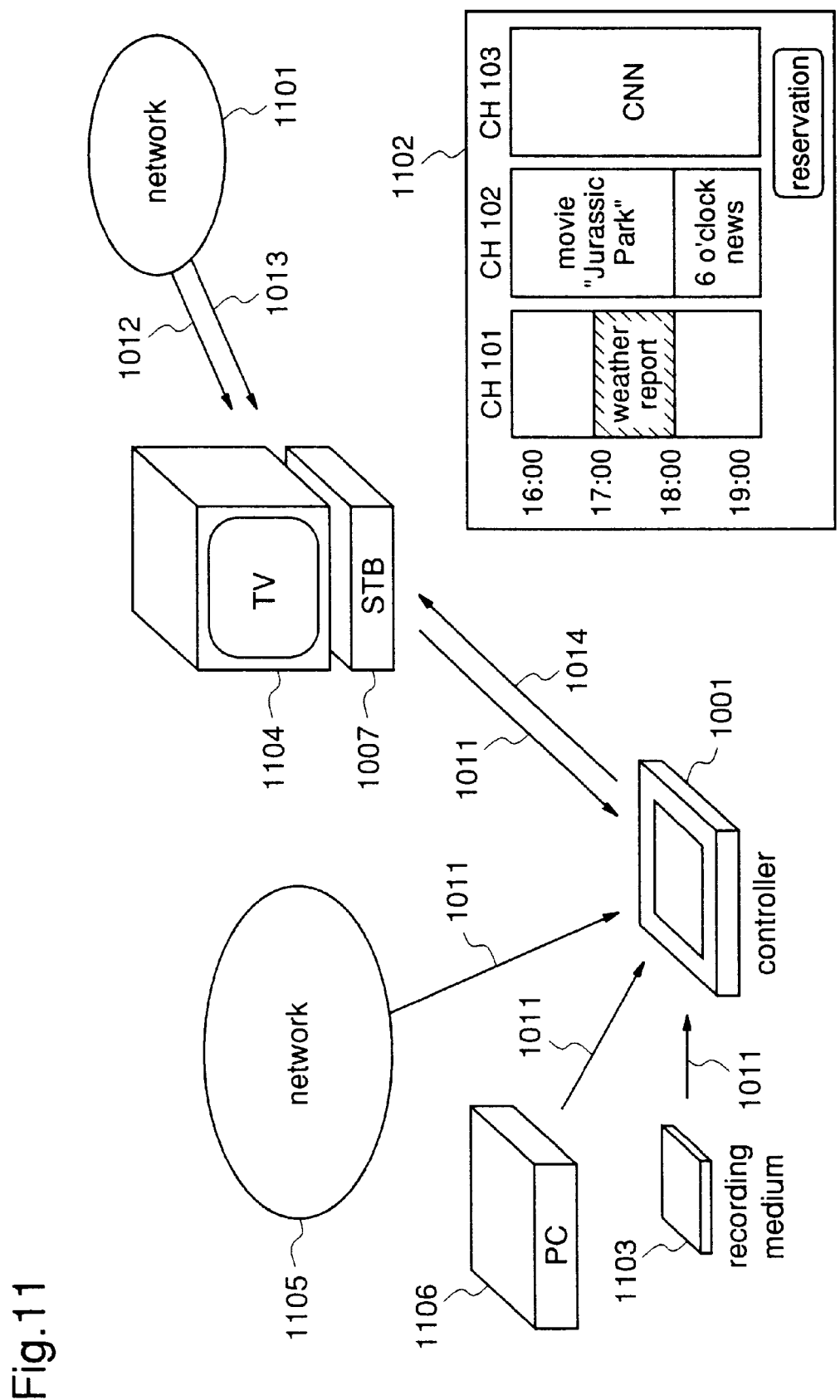
FIG. 11 is a diagram illustrating an example of the bidirectional remote control system according to the fifth embodiment.

FIG. 11 is a diagram illustrating an example of the bidirectional remote control system according to the fifth embodiment. In FIG. 11, reference numeral 1101 designates a program supply network, numeral 1102 designates a controller operation screen, numeral 1103 designates a recording medium, numeral 1104 designates a television, numeral 1105 designates a non-program supply network which does not supply a program but supplies only program information, and numeral 1106 designates a personal computer.

Figure 12:
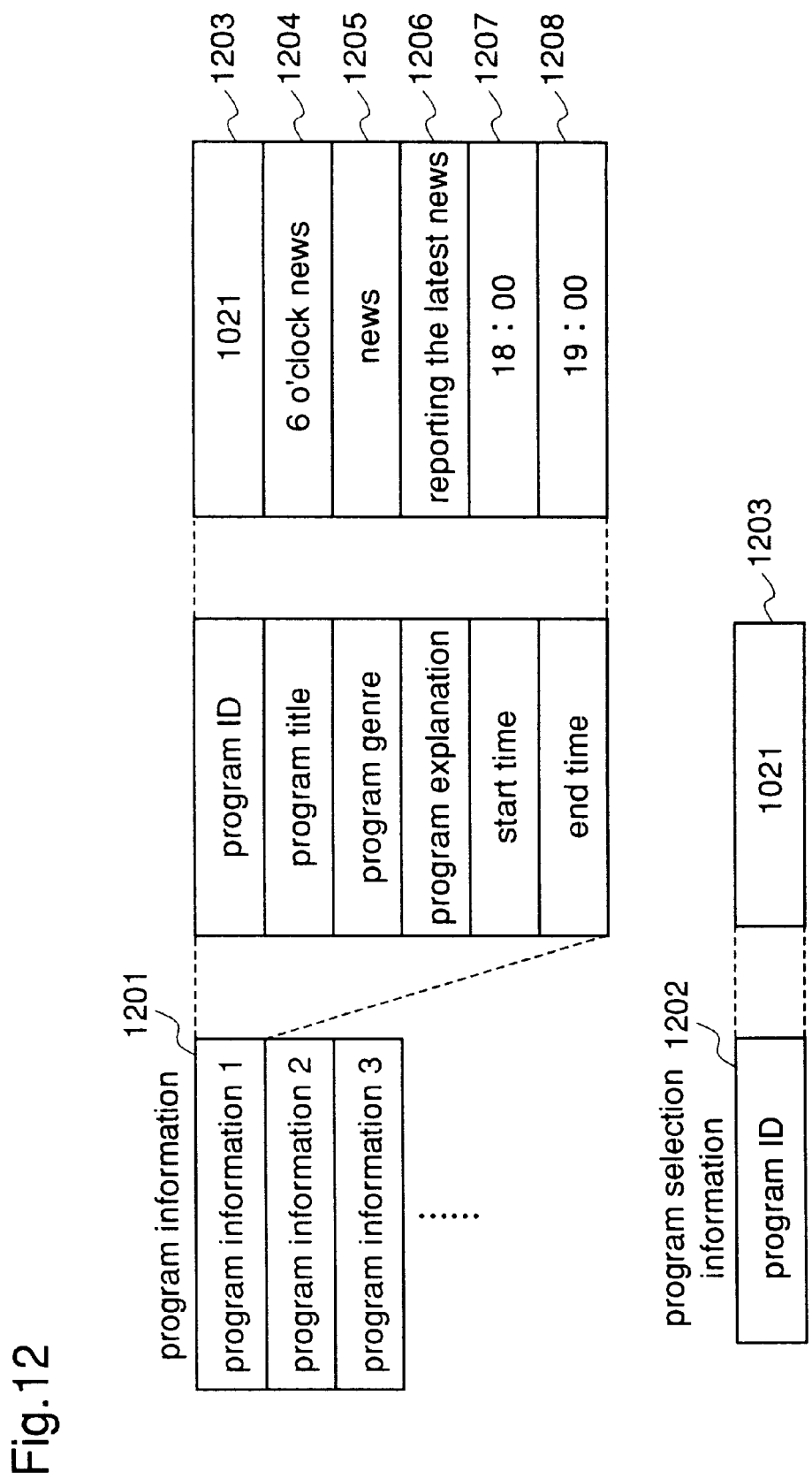
FIG. 12 is a diagram illustrating the structures of program information and program selection information, according to the fifth embodiment.

FIG. 12 is a diagram illustrating the structures of program information and program selection information according to this fifth embodiment. In FIG. 12, reference numeral 1201 designates a format of program information, numeral 1202 designates a format of program selection information, numeral 1203 designates a program ID, numeral 1204 designates the title of the program, numeral 1205 designates the genre of the program, numeral 1206 designates the explanation of the program, numeral 1207 designates the start time, and numeral 1208 designates the end time.

A description is given of the operation of the bidirectional remote control system constructed as described above.

The set-top box 1007 receives the program 1013 from the program supply network 1101 such as a satellite, a cable television, or a telephone network. From the program supply network 1101, simultaneously with the program, information of program guide which represents the content of the program is broadcast in parallel with the program, and the set-up box 1007 receives this program information 1012 as well as the program. The received program information 1012 is decoded and temporarily stored in the program information storage unit 1009. This program information 1012 is read by the CPU 1008 as desired, and displayed on the screen of the television 1104 as a program guide screen.

Furthermore, this program information 1012 is transmitted as it is, or after being subjected to some processing such as simplification for a controller of poor display ability, through the bidirectional communication unit 1006 to the controller 1001. In some cases all of the program information 1012 is sent, in other cases a part of the program information 1012 is selected by subjecting the program information 1012 to some filtering process to specify the program genre, preference of the user, broadcasting time, or channel.

On the other hand, the controller 1001 receives the program information 1011 by the bidirectional communication unit 1006a, and stores the program information 1011 in the program information storage unit 1004 through the CPU 1003. The CPU 1003 reads this program information 1011 from the program information storage unit 1004 as desired, composes the information as a graphic operation screen, and displays it on the display unit 1005. The display unit 1005 is, for example, a touch panel display. The user operates the operation screen on the display unit 1005 to select a program he/she wants to see. The selecting operation is detected by the input unit 1002 such as a button or a touch panel, and information specifying the selected program is returned to the set-top box 1007.

On receipt of the program selection information 1014, the set-top box 1007 tunes, receives, and reproduces the program, and displays the program on the television 1104.

The program information format 1201 comprises the program ID 1203 uniquely specifying the program, the program title 1204, the program genre 1205, the program explanation 1206 describing a brief introduction of the program, the start time 1207, the end time 1208, and the like. The controller 1001, which has received the program information of at least one program, generates an operation screen for the user, such as a program guide screen, from the program information, and displays it. When the user operates this screen to select a program he/she wants to see, the controller 1001 extracts the information for specifying the selected program from the stored program information, edits the information to make the program selection information, and posts it to the set-top box 1007. For example, the program selection information format 1202 includes the program ID 1203, and this information is sent back to the set-top box 1007. The set-top box 1007 tunes, receives, and reproduces the selected program, and displays the program on the television 1104.

While in this fifth embodiment the program supply network 1101 is described as an example of a supply source of program information, any other media may be employed as long as it can supply program information, for example, a personal computer 1106, a recording medium 1103 such as a floppy disk, a compact disk (CD) or a digital video disk (DVD), or a non-program supply network 1105 such as internet, which is not connected with the set-top box 1007. Further, although in this fifth embodiment the set-top box 1007 is described as an example of a device controlled by the bidirectional remote controller, any other device may be employed as long as it can provide a program, for example, a television, a video deck, a disk player such as a DVD, or a video server.

Embodiment 6

A sixth embodiment of the present invention corresponds to claims 21~24 and relates to a bidirectional remote control system having a plurality of devices controlled by a bidirectional remote controller, in addition to the structure of the bidirectional remote control system according to the fifth embodiment.

In this sixth embodiment, a VCR (Video Cassette Recorder) is added to the structure of the fifth embodiment, as a device controlled by the bidirectional remote controller, and a satellite broadcast or a cable television broadcast is received, reproduced and recorded by a set-top box.

Hereinafter, a bidirectional remote controller, devices controlled by the bidirectional remote controller, and a bidirectional remote control system according to the sixth embodiment of the invention will be described with reference to FIGS. 13, 14, and 15.

Figure 13:
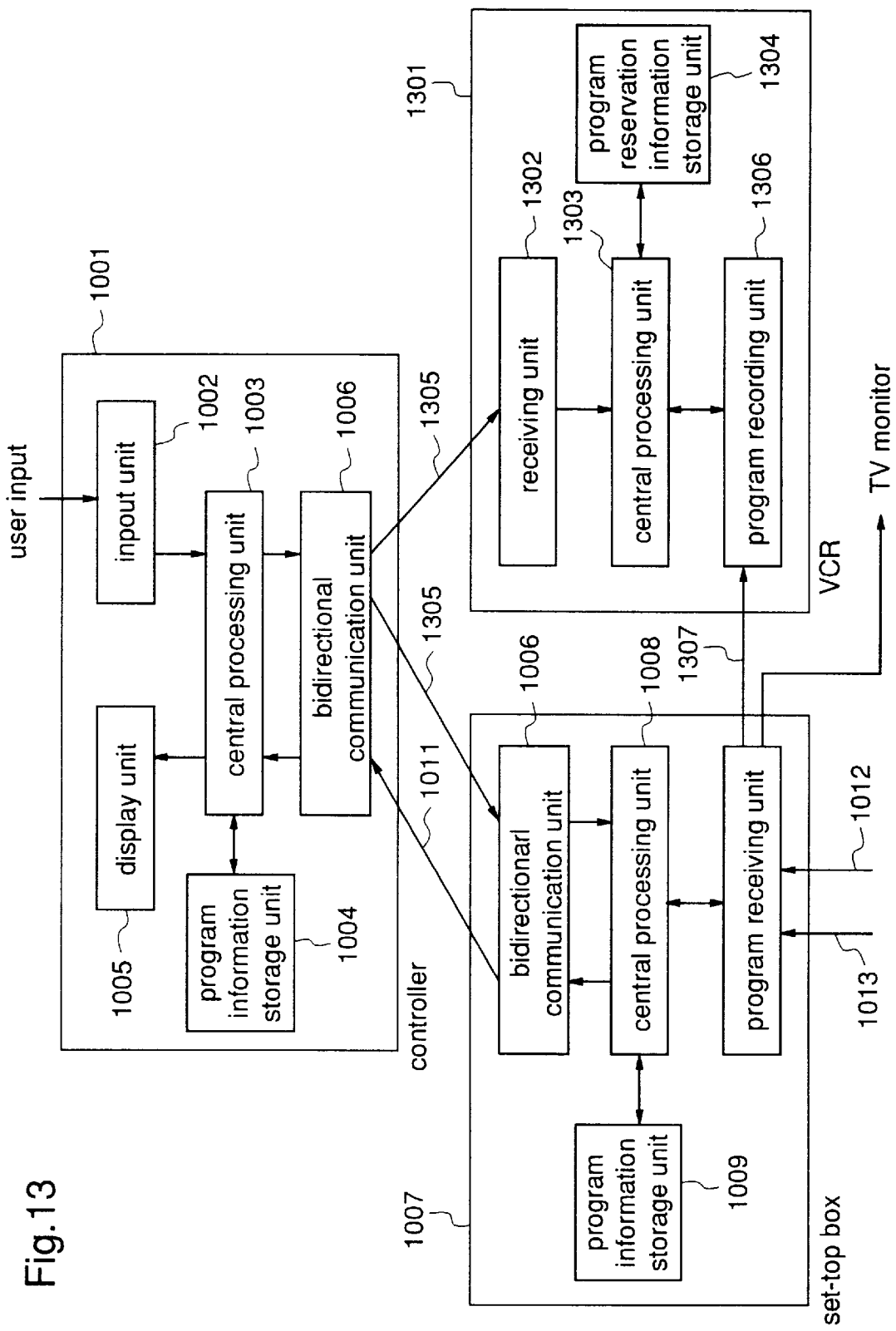
FIG. 13 is a block diagram illustrating a bidirectional remote control system according to a sixth embodiment of the present invention.

FIG. 13 is a block diagram illustrating a bidirectional remote control system according to the sixth embodiment of the invention.

In FIG. 13, reference numeral 1301 designates a VCR (Video Cassette Recorder) as a device controlled by the bidirectional remote controller 1001, and this VCR 1301 comprises a receiving unit 1302, a central processing unit (CPU) 1303, a program reservation information storage unit 1304, and a program recording unit 1306. Further, reference numeral 1305 designates program reservation information, and numeral 1307 designates a reproduced program.

Figure 14:
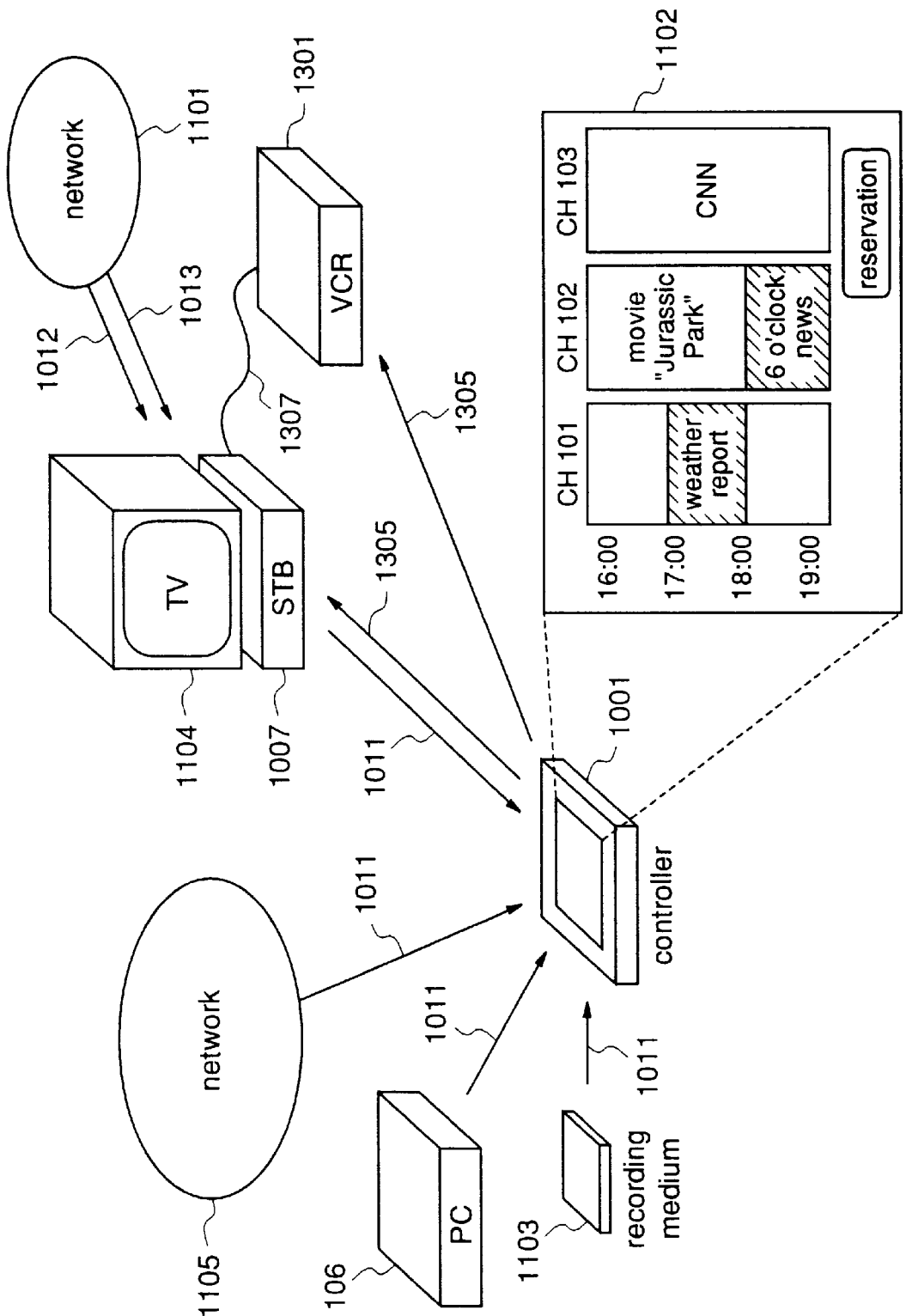
FIG. 14 is a diagram illustrating an example of the bidirectional remote control system according to the sixth embodiment.

FIG. 14 is a diagram showing an example of the bidirectional remote control system according to this sixth embodiment.

Figure 15:
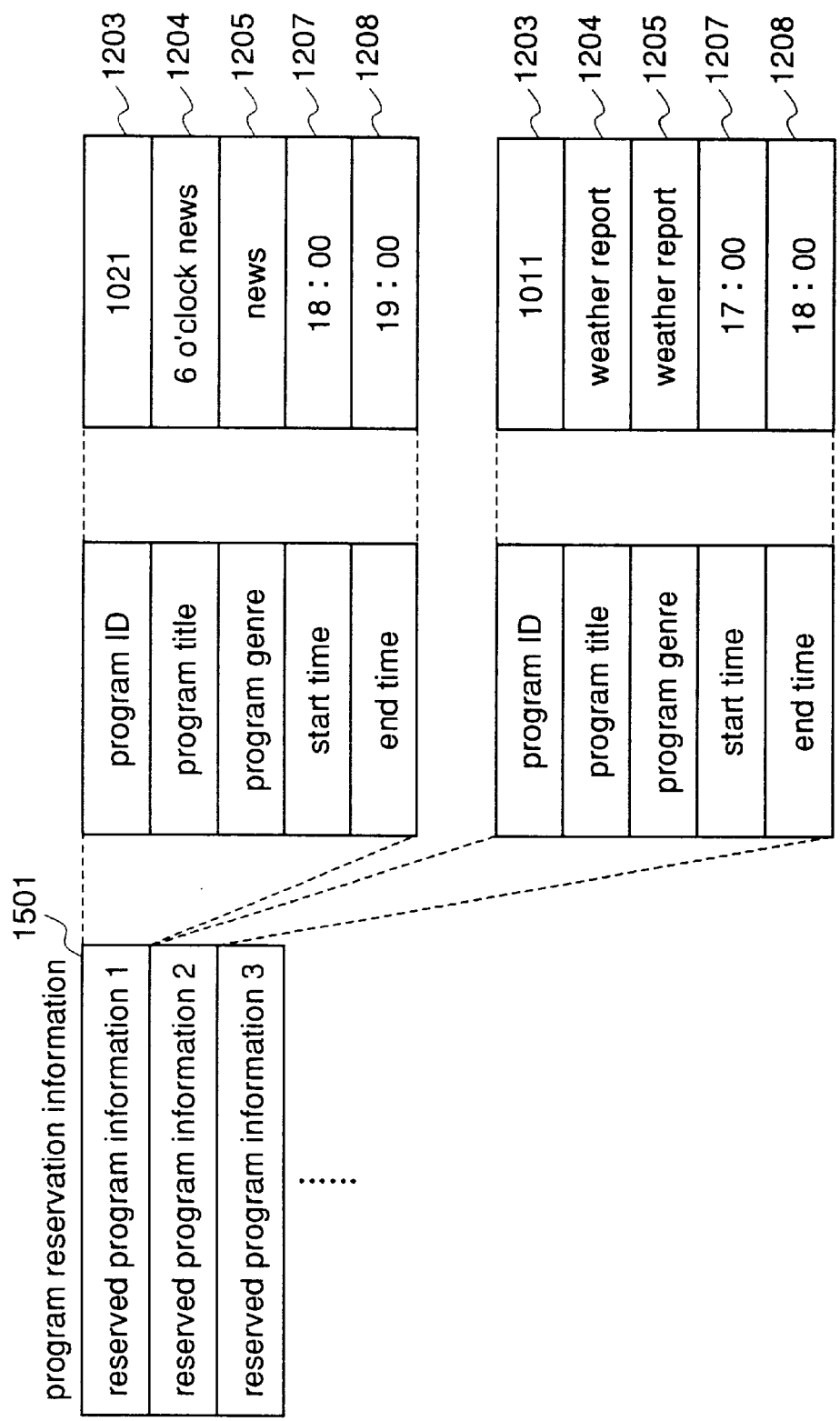
FIG. 15 is a diagram illustrating the structure of program reservation information according to the sixth embodiment.

FIG. 15 is a diagram showing the structure of program reservation information according to this sixth embodiment. In FIG. 15, reference numeral 1501 designates a format of program reservation information.

Hereinafter, a description is given of the operation of the bidirectional remote control system constructed as described above.

As in the fifth embodiment of the invention, the program information 1011 is sent from the set-top box 1007 to the controller 1001. The controller 1001 receives the program information 1011 and stores it in the program information storage unit 1004. This information is composed as a graphic operation screen and displayed on the display unit 1005 as desired. The user operates the displayed operation screen to select a program he/she wants to reverse. In this sixth embodiment, the controller 1001 and the set-top box 1007 are not necessarily connected online. For example, when the user carries the set-top box 1007 out of the room or operates the controller 1001 in a room other than the room where the set-top box 1007 is placed, the user may select a program in the offline state.

The procedures of uploading and downloading are identical to those described for the first embodiment.

Thereafter, the program reservation information 1305, which is described later, is returned to the set-top box 1007, and the program reservation information 1305 is set in the set-top box 1007 to reserve the program. Although only one program is reserved in the above description, the user can perform batch reservation for a plurality of programs by selecting these programs at one time and sending the program reservation information of these programs to the set-top box 1007. Further, the program reservation information 1305 is received by the receiving unit 1302 of the VCR 1301 as well, whereby recording of the program is reserved in the VCR 1301.

As shown in FIG. 15, the program reservation information 1305 comprises the program ID specifying a program, the title of the program, the genre of the program, the start time, the end time, and the like. For example, in FIG. 14, two programs, "weather report" and "6 o'clock news", are selected, and the program reservation information 1305 of each program is edited in the form of the program reservation information format 1501 shown in FIG. 15 by the CPU 1003 in the controller 1001. Then, the program reservation information 1305 is sent from the controller 1001 to the set-top box 1007 and the VCR 1301. The set-top box 1007 and the VCR 1301 receive the program reservation information 1305 to store it. When the start time of the reserved program has come, the CPU 1303 activates the program recording unit 1306 to record the reproduced program 1307 from the set-top box 1007.

While in this sixth embodiment the VCR 1301 is employed as a device controlled by the controller 1001, any device may be employed as long as it can record a program, for example, a DVD-RAM or a hard disk unit.

Further, while in this sixth embodiment the set-top box 1007 and the VCR 1301 are employed as devices controlled by the controller 1001, a home server obtained by uniting the functions of these devices may be employed as a device controlled by the controller 1001.

Embodiment 7

A seventh embodiment of the present invention corresponds to claim 25 and relates to a bidirectional remote control system in which setting of reservation is displayed on a device controlled by the bidirectional remote controller to make it easier to see for the user, as compared with the bidirectional remote control system of the sixth embodiment in which setting of reservation is displayed on the bidirectional remote controller.

To be specific, in this seventh embodiment, in contrast with the sixth embodiment, reservation of a program is carried out on the side of the set-top box 1007 by using the operation screen displayed on the television, and the program reservation information 1305 of the reserved program is transmitted from the set-top box 1007 to the VCR 1301 through the controller 1001.

Hereinafter, a bidirectional remote controller, a device controlled by the bidirectional remote controller, and a bidirectional remote control system according to the seventh embodiment of the present invention will be described with reference to FIGS. 16 and 17.

Figure 16:
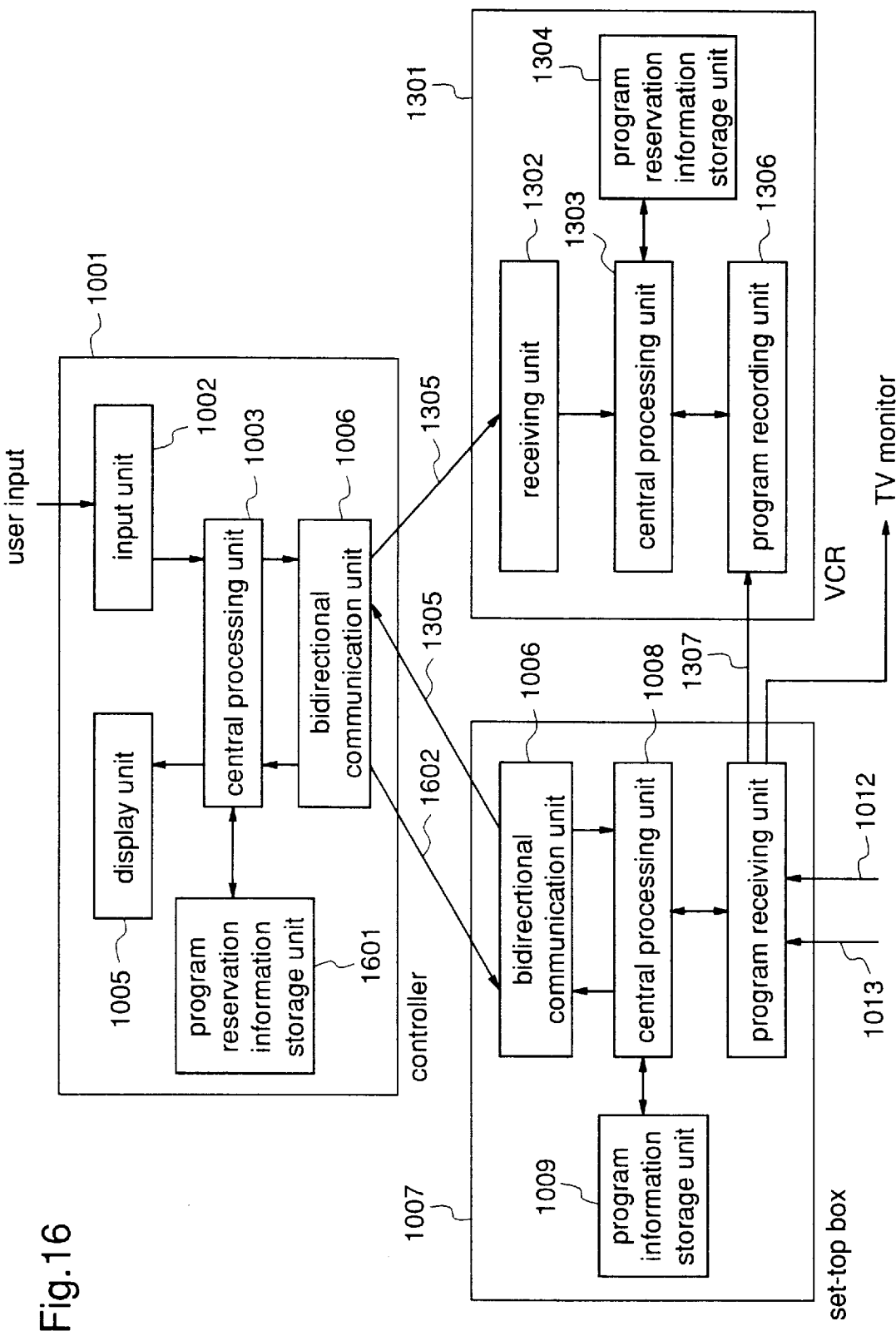
FIG. 16 is a block diagram illustrating a bidirectional remote control system according to a seventh embodiment of the present invention.

FIG. 16 is a block diagram illustrating a bidirectional remote control system according to the seventh embodiment of the invention. In FIG. 16, reference numeral 1601 designates a program reservation information storage unit disposed in the bidirectional remote controller 1001, and numeral 1602 designates pointing information.

Figure 17:
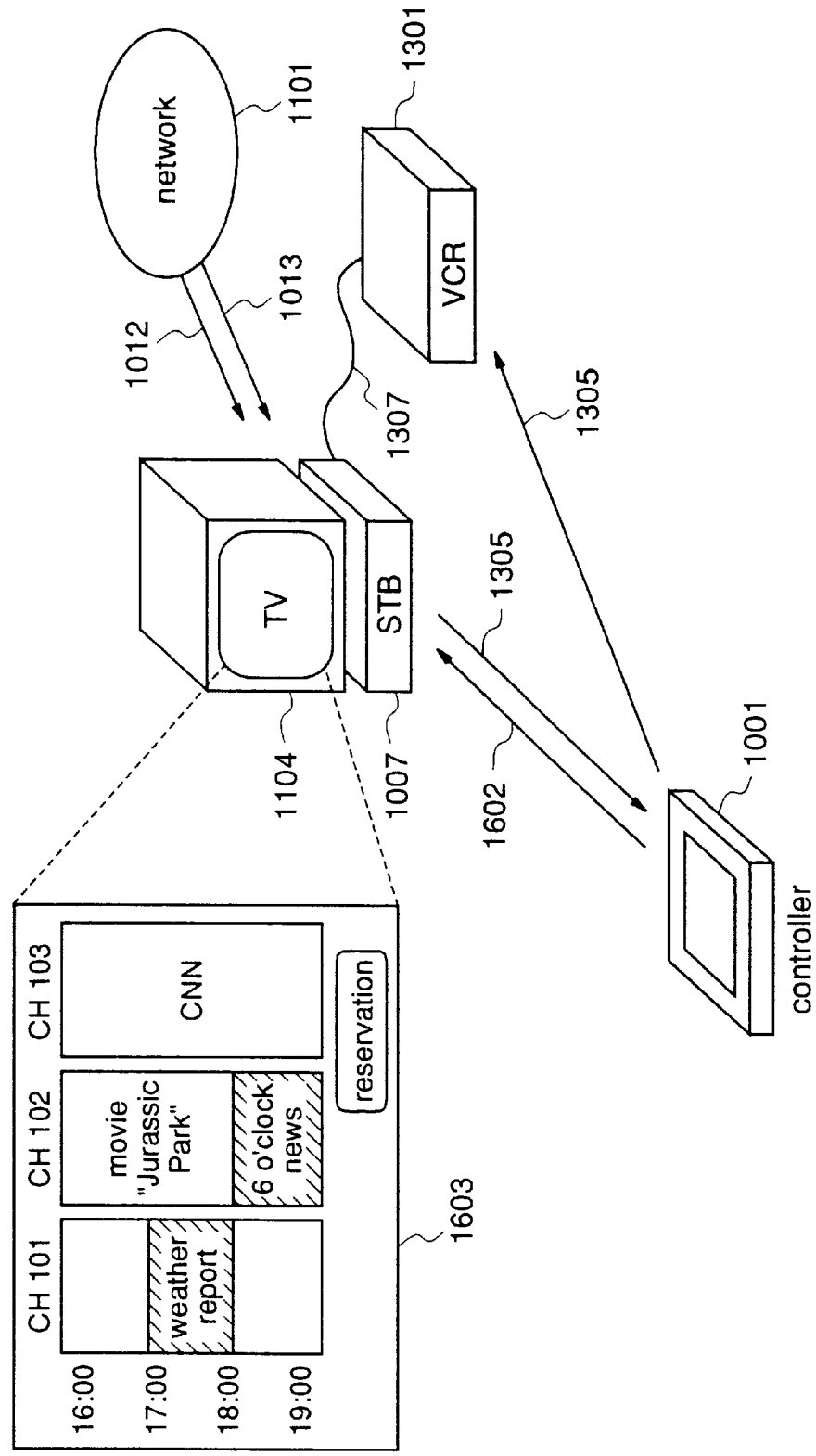
FIG. 17 is a diagram illustrating an example of the control system according to the seventh embodiment.

FIG. 17 is a diagram illustrating an example of the bidirectional remote control system according to this seventh embodiment. In FIG. 17, reference numeral 1603 designates a program operation screen.

Hereinafter, a description is given of the operation of the bidirectional remote control system constructed as described above.

In this seventh embodiment, the set-top box 1007, which has received the program 1013 and the program information 1012, composes the program operation screen 1603 based on the program information 1012, and displays it on the television 1104. The user operates the controller 1001 to make a reservation of program while viewing the television screen. At this time, pointing information 1602 for selecting a desired program, such as "up", "down", "left", "right", is sent from the controller 1001. When the reservation of program has been made, in the set-top box 1007, the CPU 1008 generates program reservation information 1305 in a format acceptable by the controller 1001 and the VCR 1301, and sends it through the bidirectional communication unit 1005 to the controller 1001. The controller 1001 receives the program reservation information 1305, stores it in the program reservation information storage unit 1601, and displays the list of the reserved programs on the display unit 1005. When the user confirms the displayed content and performs reservation confirming operation with the controller 1001 being directed to the VCR 1301, the program reservation information 1305 stored in the program reservation information storage means 1601 is sent to the VCR 1301. The VCR 1301 receives the program reservation information 1305, whereby reservation is completed. When the specified time has come, the reserved program is received and reproduced by the set-top box 1007 and, simultaneously, recorded in the VCR 1301.

In this seventh embodiment, since the setting of reservation is made easier to see as compared with the sixth embodiment, program reservation is carried out with high reliability.

The display for confirmation of reservation at the controller end is not always required, and the program reservation information 1305 may be relayed to the VCR 1301 without confirmation.

Embodiment 8

An eighth embodiment of the present invention corresponds to claim 26 and relates to a bidirectional remote control system in which the recording location of a selected program is added as program reservation information, and the selected program is reproduced more rapidly by referring to this information. The fundamental structure of the system is identical to that described for the sixth or seventh embodiment of the invention.

Hereinafter, a bidirectional remote controller, a device controlled by the bidirectional remote controller, and a bidirectional remote control system according to the eighth embodiment of the invention will be described with reference to FIGS. 18 and 19.

Figure 18:
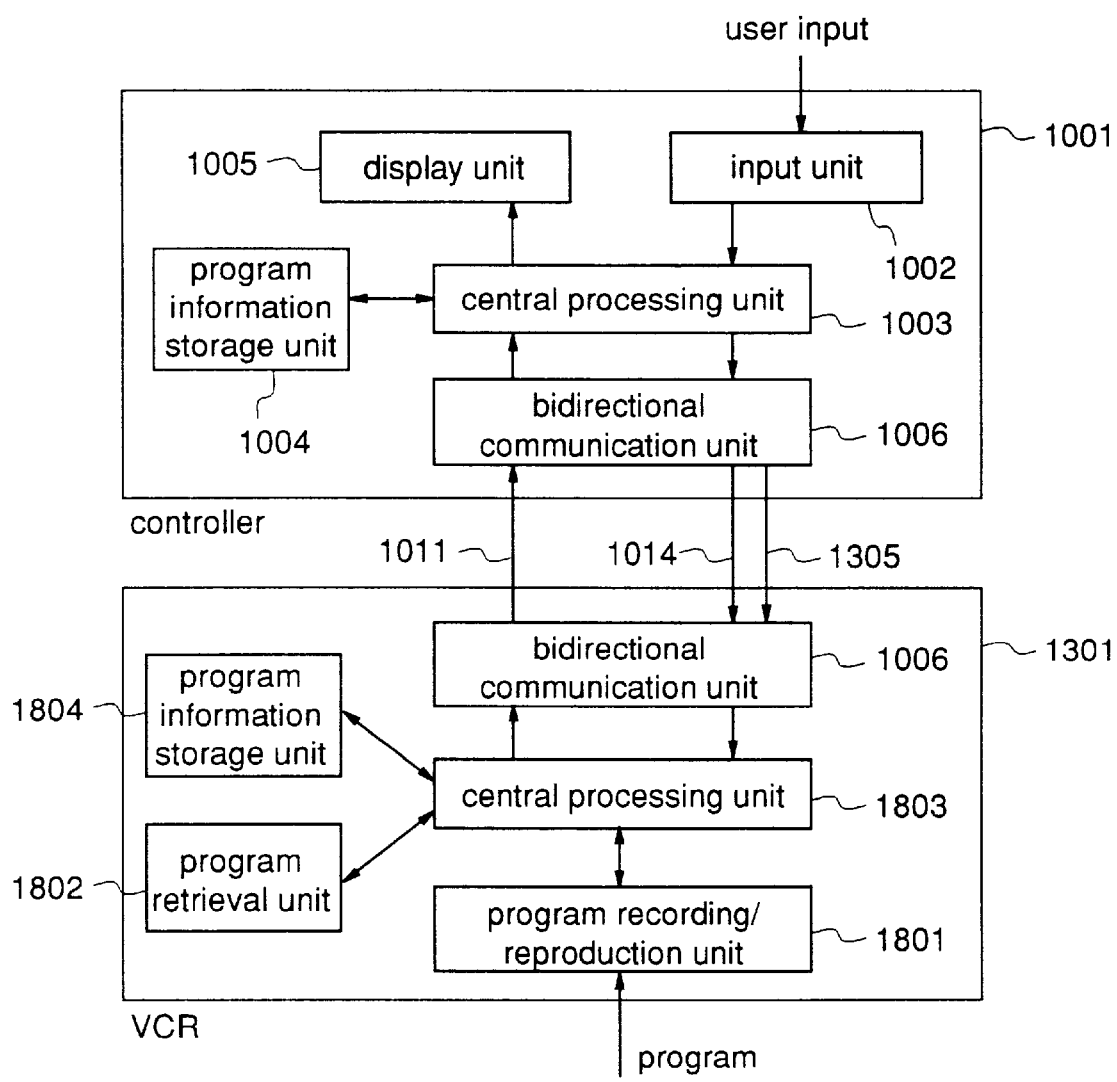
FIG. 18 is a block diagram illustrating a bidirectional remote control system according to an eighth embodiment of the present invention.

FIG. 18 is a block diagram illustrating a bidirectional remote control system according to the eighth embodiment of the invention. In FIG. 18, reference numeral 1301 designates a VCR (Video Cassette Recorder) as a device controlled by the bidirectional remote controller 1001, and the VCR 1301 comprises a program recording and reproduction unit 1801, a program retrieval unit 1802, a central processing unit (CPU) 1803, and a program information storage unit 1804.

Figure 19:
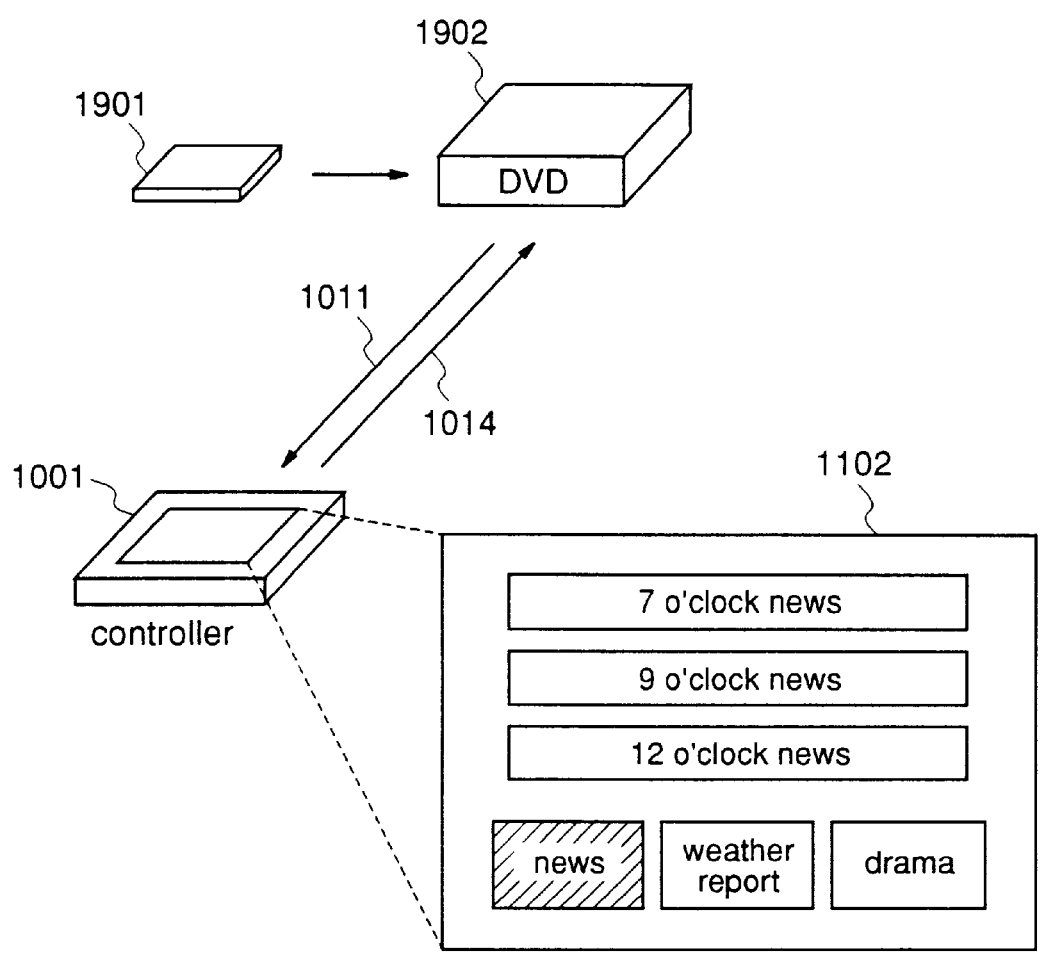
FIG. 19 is a diagram illustrating an example of the control system according to the eighth embodiment.

FIG. 19 is a diagram illustrating an example of the control system according to the eighth embodiment. In FIG. 19, reference numeral 1901 designates a recording medium, and numeral 1902 designates a DVD recording and reproduction unit.

A description is given of the operation of the bidirectional remote control system constructed as described above.

In this eighth embodiment, as in the sixth and seventh embodiments, information for retrieving a program (program genre, title, etc.) is included in the program reservation information 1305 which is sent to the VCR 1301 and, when recording the program, the recording position of the program is stored in the program information storage unit 1804 together with the program information.

When the user views the recorded program, the program information 1011 such as the title of the recorded program is transferred from the VCR 1301 to the controller 1001 through the bidirectional communication unit 1006, and an operation screen for program selection is composed and displayed at the controller end. At this time, the program retrieval unit 1802 selects a part of the program information 1011 by filtering based on the retrieval condition such as the genre or title of the program specified by the user, and sends it to the controller 1001. When the user selects a program, the program selection information 1014 is returned to the VCR 1301, and the CPU 1803 immediately reproduces the program with reference to the recording position of the program which is stored in the program information storage unit 1804, thereby realizing reproduction of the recorded program by direct designation. For example, in FIG. 19, when "news" is designated as the program genre, the controller 1001 captures program information of three programs (7 o'clock news, 9 o'clock news, and 12 o'clock news) and displays the program menu.

While in this eighth embodiment a VCR is employed as an example of a device controlled by the controller 1001, any device may be employed as long as it can record a program, for example, a DVD recording and reproduction unit 1902 shown in FIG. 19 or a hard disk unit. Further, while in this eighth embodiment the program reservation information is transferred to the VCR through the controller to record the program information together with the program, the program information may be obtained directly from a program supply network such as broadcast wave or cable television. Furthermore, it is also possible to utilize a recording medium 1901 such as a DVD-ROM, in which program information is previously recorded together with a program according to a predetermined format.

What is claimed is:

1. A bidirectional remote control system comprising a bidirectional remote controller and a first and a second devices controlled by the bidirectional remote controller, wherein the first device controlled by the bidirectional remote controller receives a request of device information from the bidirectional remote controller, and sends device information to the bidirectional remote controller, the bidirectional remote controller sends the request of device information to the first device controlled by the bidirectional remote controller, and receives device information from the first device controlled by the bidirectional remote controller, and sends device information to the second device controlled by the bidirectional remote controller, and the second device controlled by the bidirectional remote controller receives device information from the bidirectional remote controller.

2. A bidirectional remote controller system as defined in claim 1, wherein, the second device controlled by the bidirectional remote controller is a microwave oven, and device information is setting information of the microwave oven.

3. A bidirectional remote controller system as defined in claim 1, wherein, the second device controlled by the bidirectional remote controller is a car navigator, and device information is course setting information.

4. A bidirectional remote controller comprising a central processing unit and a storage unit for storing device information, wherein, the central processing unit sends a request of device information to the first device controlled by the bidirectional remote controller, and receives device information from the first device controlled by the bidirectional remote controller, and sends device information to the second device controlled by the bidirectional remote controller, as well as storing device information in the storage unit.

5. A bidirectional remote control system comprising a bidirectional remote controller and a first and a second devices controlled by the bidirectional remote controller, wherein the first device controlled by the bidirectional remote controller receives a request of device information from the bidirectional remote controller, and sends device information to the bidirectional remote controller, the bidirectional remote controller sends the request of device information to the first device controlled by the bidirectional remote controller, and receives device information from the first device controlled by the bidirectional remote controller, and reconfigures device information in accordance with an input of an operator, and sends the reconfigured device information to the second device controlled by the bidirectional remote controller, and the second device controlled by the bidirectional remote controller receives the reconfigured device information from the bidirectional remote controller.

6. A bidirectional remote controller comprising a central processing unit and a storage unit for storing device information, wherein, the central processing unit sends a request of device information to the first device controlled by the bidirectional remote controller, and receives device information from the first device controlled by the bidirectional remote controller, and reconfigures device information in accordance with an input of an operator, and sends the reconfigured device information to the second device controlled by the bidirectional remote controller.

7. A bidirectional remote control system comprising a bidirectional remote controller and first and second devices controlled by the bidirectional remote controller, wherein, the first device controlled by the bidirectional remote controller comprises:

a first device information storage unit for storing device information to provide to the second device controlled by the bidirectional remote controller;

a first bidirectional communication unit for receiving a request for device information, and sending device information stored in the first device information storage unit to the bidirectional remote controller; and the second device controlled by the bidirectional remote controller comprises:

a second device information storage unit for storing device information;

a controlled device body for performing an operation in accordance with device information stored in the second device information storage unit; and the bidirectional remote controller comprises:

a controller device information storage unit for storing device information sent from the first device controlled by the bidirectional remote controller;

a controller bidirectional communication unit for sending a request for device information to the first device controlled by the bidirectional remote controller, and receiving device information sent from the first device controlled by the bidirectional remote controller, and sending device information stored in the controller device information storage unit to the second device controlled by the bidirectional remote controller;

an input device for communicating an input to the bidirectional remote controller;

a central processing unit for controlling the operations of the controller device information storage unit, the controller bidirectional communication unit, and the input device.

8. A bidirectional remote controller comprising:

a device information storage unit for storing device information sent from a first device controlled by the bidirectional remote controller, a bidirectional communication unit for sending a request for device information to the first device controlled by the bidirectional remote controller, and receiving device information sent from the first device controlled by the bidirectional remote controller, and sending device information stored in the device information storage unit to a second device controlled by the bidirectional remote controller, an input device for communicating an input to the bidirectional remote controller, and a central processing unit for controlling operations of the device information storage unit, the bidirectional communication unit, and the input device.

9. A bidirectional remote control system comprising a bidirectional remote controller and first and second devices controlled by the bidirectional remote controller, wherein, the first device controlled by the bidirectional remote controller comprises:
a first device information storage unit for storing device information to provide to the second device controlled by the bidirectional remote controller;
a first bidirectional communication unit for receiving a request for device information sent from the bidirectional remote controller, and sending device information stored in the first device information storage unit to the bidirectional remote controller; and the second device controlled by the bidirectional remote controller comprises:
a second device information storage unit for storing device information sent from the bidirectional remote controller;
a controlled device body for performing an operation in accordance with device information stored in the second device information storage unit; and the bidirectional remote controller comprises:
a controller device information storage unit for storing device information sent from the first device controlled by the bidirectional remote controller;
a display unit for displaying device information stored in the first device information storage unit;
a controller bidirectional communication unit for sending a request for device information to the first device controlled by the bidirectional remote controller, and receiving device information sent from the first device controlled by the bidirectional remote controller, and sending device information stored in the controller device information storage unit to the second device controlled by the bidirectional remote controller;
an input device for communicating an input to the bidirectional remote controller;
a central processing unit for controlling the operations of the controller device information storage unit, the controller bidirectional communication unit, the display unit and the input device, and reconfiguring device information in accordance with input of the input device, to restore said reconfigured device information in the controller device information storage unit.

10. A bidirectional remote controller comprising;
a device information storage unit for storing device information sent from a first device controlled by the bidirectional remote controller,
a display unit for displaying device information stored in the device information storage unit,
a bidirectional communication unit for sending a request of device information to the first device controlled by the bidirectional remote controller, and receiving device information sent from the first device controlled by the bidirectional remote controller, and sending device information stored in the device information storage unit to the second device controlled by the bidirectional remote controller,
an input device for communicating input to the bidirectional remote controller, a central processing unit for controlling operations of the device information storage unit, the bidirectional communication unit, the display unit, and the input device, and reconfiguring device information in accordance with the input of the input device, to restore said reconfigured device information in the device information storage unit.

11. A bidirectional remote control system comprising a bidirectional remote controller, a program supply unit, and a program recording unit, for recording a program output by the program supply unit in the program recording unit, wherein, the program supply unit comprises:
a program information storing unit for storing program information and providing the program information to the program recording unit; and
a bidirectional communication unit for receiving a request from the bidirectional remote controller for program information and sending program information stored in the program information storing unit to the bidirectional remote controller;

the program recording unit comprises:
a receiving unit for receiving program information sent from the bidirectional remote controller;
a program information storing unit for storing program information received in the receiving unit;
a program recording unit body for recording a program in accordance with program information stored in the program information storing unit; and the bidirectional remote controller comprises:
a program information storing unit for storing program information sent from the program supply unit;
a bidirectional communication unit for sending a request for program information to the program supply unit, and receiving program information sent from the program supply unit, and sending program information stored in the program information storing unit to the program recording unit;
an input device for communicating an input to the bidirectional remote controller;
a central processing unit for controlling operations of the program information storing unit, the bidirectional communication unit, and the input device.

12. A bidirectional remote controller comprising:
a program information storing unit for storing program information sent from a program supply unit,
a bidirectional communication unit for sending a request for program information to the program information supply unit, and receiving program information sent from program supply unit, and sending program information stored in the program information storing unit to a program recording unit,
an input device for communicating an input to the bidirectional remote controller,
a central processing unit for controlling operations of the program information storing unit, the bidirectional communication unit, and the input device.

13. A bidirectional remote control system comprising a bidirectional remote controller, a program supply unit, and a program recording unit, for recording a program output by the program supply unit in the program recording unit, wherein, the program supply unit comprises:
a program information storing unit for storing program information and providing the program information to the program recording unit, a bidirectional communication unit for receiving a request of program information sent from the bidirectional remote controller, and sending program information stored in the program information storing unit to the bidirectional remote controller;

the program recording unit comprises:
- a receiving unit for receiving the program information sent from the bidirectional remote controller,
- a program information storing unit for storing the program information received in the receiving unit,
- a program recording unit body for performing a program recording operation in accordance with the program information stored in the program information storing unit; and the bidirectional remote controller comprises
- a program information storing unit for storing program information sent from the program supply unit;
- a display unit for displaying program information stored in the program information storing unit;
- a bidirectional communication unit for sending a request for program information to the program supply unit, and receiving program information sent from the program supply unit, and sending program information stored in the program information storing unit to the program recording unit;
- an input device for communicating an input to the bidirectional remote controller;
- a central processing unit for controlling operations of the program information storing unit, the bidirectional communication unit, the display unit, and the input device, and reconfiguring program information stored in the program information storing unit in accordance with a program selection input of an operator to the input device, to restore said reconfigured program information in the program information unit.

14. A bidirectional remote controller comprising, a program information storing unit for storing program information from a program supply unit, a display unit for displaying program information stored in the program information storing unit, a bidirectional communication unit for sending a request for program information to the program information supply unit, and receiving program information sent from program supply unit, and sending program information stored in the program information storing unit to a program recording unit, an input device for communicating an input to the bidirectional remote controller, a central processing unit for controlling operations of the program information storing unit, the bidirectional communication unit, the display unit, and the input device, and reconfiguring the program information stored in the program information storing unit in accordance with a program selection input of an operator to the input device to restore said reconfigured program information in the program information unit.

\* \* \* \* \*